US006391535B1

(12) United States Patent
Arimoto et al.

(10) Patent No.: US 6,391,535 B1
(45) Date of Patent: May 21, 2002

(54) SILVER HALIDE PHOTOTHERMOGRAHIC MATERIAL

(75) Inventors: Tadashi Arimoto; Takayuki Sasaki, both of Hino (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/550,553

(22) Filed: Apr. 17, 2000

(30) Foreign Application Priority Data

Apr. 19, 1999 (JP) ............................................. 11-110795

(51) Int. Cl.[7] ............................ G03C 1/498; G03C 1/76
(52) U.S. Cl. ........................ 430/619; 430/510; 430/517; 430/522; 430/531; 430/944
(58) Field of Search ................................. 430/619, 517, 430/510, 522, 944, 531

(56) References Cited

U.S. PATENT DOCUMENTS

| | | | | | |
|---|---|---|---|---|---|
| 4,581,321 | A | * | 4/1986 | Kitchin et al. | 430/522 |
| 5,380,635 | A | * | 1/1995 | Gomez et al. | 430/517 |
| 5,496,695 | A | * | 3/1996 | Simpson et al. | 430/619 |
| 5,750,318 | A | * | 5/1998 | Lambert et al. | 430/346 |
| 5,800,861 | A | * | 9/1998 | Chiang et al. | 427/160 |
| 5,985,537 | A | * | 11/1999 | Philip, Jr. et al. | 430/619 |
| 6,063,560 | A | * | 5/2000 | Suzuki et al. | 430/619 |
| 6,117,624 | A | * | 9/2000 | Shor et al. | 430/350 |

* cited by examiner

Primary Examiner—Thorl Chea
(74) Attorney, Agent, or Firm—Cantor Colburn LLP

(57) ABSTRACT

A silver halide photothermographic material is disclosed, comprising on a support an organic silver salt and a silver halide, wherein the support has thereon a sublayer containing an infrared absorbing compound exhibiting an absorption maximum at a wavelength of 700 to 900 nm.

6 Claims, No Drawings

SILVER HALIDE PHOTOTHERMOGRAHIC MATERIAL

FIELD OF THE INVENTION

The present invention relates to thermally developable silver halide photothermographic materials.

BACKGROUND OF THE INVENTION

Thermally developable silver halide photothermographic materials are disclosed in D. Morgan and B. Shely, U.S. Pat. Nos. 3,152,904 and 3,457,075, and D. H. Klisterboer, "Thermally Processed Silver Systems" in Imaging Processes and Materials, Neblette's Eighth Edition, Edited by J. M. Sturge, V. Walworth and A. Shepp, page 2, 1989.

The thermally developable silver halide photothermographic material contains a reducible silver source (such as organic silver salts), a catalytic active amount of a photocatalyst (such as silver halide), a tone modifier controlling silver image tone and a reducing agent, which are usually in the form of being dispersed in organic binder. Silver halide photothermographic materials are stable at ordinary temperatures and when heated at a high temperature (e.g., 80° C. or higher) after exposure, silver is formed through oxidation-reduction reaction between a reducible silver salt (which functions as an oxidizing agent) and a reducing agent. The oxidation-reduction reaction is catalyzed by latent images produced by exposure. Silver formed through reaction of an organic acid silver salt in exposed areas provides black-and-white images, which are in contrast to non-exposed areas. In the field of medical diagnostic and printing, advancements in the technique for processing are directed toward simplification, rapid access and friendliness to earth.

There is a system in this direction, including exposure to infrared laser (having wavelengths of 750 nm or more) and thermal processing. To obtain images with higher sharpness in this system, infrared dyes exhibiting absorption suited for infrared lasers are needed to prevent halation or irradiation. When a photosensitive layer is exposed to infrared rays, a part of the infrared rays which do not contribute to image formation penetrate to the support without being absorbed, is reflected thereon and returns to the image forming region, deteriorating sharpness of images. It is therefore necessary to absorb or shield as much as possible the infrared rays not contributing to image formation.

An antihalation layer to prevent halation is conventionally provided in any of the component layers of the photothermographic material, except for a sub-coating layer, specifically as a backing layer. However, it is impossible to completely prevent halation thereby. U.S. Pat. Nos. 4,581,323 and 4,312,941 disclose such a layer to prevent composite reflection of light scattered between layers internal to the photosensitive component. U.S. Pat. Nos. 4,477,562 and 4,409,316 disclose a peelable antihalation layer by the use of carbon black. In this method, however, the peelable layer makes difficult adhesion thereto during the stage of coating, converting or packaging and also produces colored scrap sheets. Therefore, these techniques are not desirable methods to solve the problems described above.

After being subjected to exposure and thermal processing, the photothermographic material sometimes produces non-uniformity due to interference fringes. It is contemplated that this nonuniformity due to interference fringes originates before formation of the images, i.e., at the stage of preparing the photothermographic material and its influence is displayed at the time of exposure. It is therefore desired to solve such problems.

U.S. Pat. No. 4,581,325 and European Patent 377,961 disclose photothermographic material containing polymethine and nonpolar dyes to prevent infrared halation. These dyes exhibit not only superior infrared absorptivity but also visible light absorptivity in the subsequent exposure.

JP-A 7-191432 (hereinafter, the term, JP-A means an unexamined and published Japanese Patent Application) discloses incorporation of water-soluble polymethine dyes in a hydrophilic layer of a silver halide photothermographic material. U.S. Pat. No. 5,496,695 and Tokuhyohei 9-509503 discloses squarylium dyes exhibiting no absorption in the visible region; and JP-A 7-191432 and 9-230531 disclose infrared absorbing polymethine dyes.

To solve problems described above, such as deterioration in image sharpness and uneven density due to interference fringes produced when silver halide photothermographic materials are exposed to infrared rays to form images, the following techniques were disclosed.

The use of the squarylium dyes and polymethine dyes described above was found to be effective to some extents to prevent halation. However, incorporation of the dyes into an antihalation layer or a photosensitive layer thickens fine image portions, easily deteriorating sharpness.

JP-B 6-10735 and JP-A 8-211521 discloses methods for improving interference fringes. However, satisfactory results were not obtained. Further, it was found that when infrared absorbing compounds such as infrared dyes were used in the backing layer, remarkable interference fringes were often observed.

SUMMARY OF THE INVENTION

Accordingly, an object of the present invention is to provide silver halide photothermographic materials exhibiting antihalation effects, superior sharpness and with no uneven density due to interference fringes.

The object of the present invention can be accomplished by the following constitution:

1. A silver halide photothermographic material comprising on a support an organic silver salt and a silver halide, wherein the support has thereon a sublayer containing an infrared absorbing compound exhibiting an absorption maximum at a wavelength of 700 to 900 nm;

2. The photothermographic material described in 1., wherein the infrared absorbing compound is a water-soluble infrared absorbing compound, a compound represented by formula (I), a compound represented by formula (II), a copper-containing phosphate compound or metal oxide particles:

formula (I)

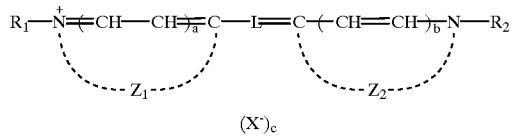

wherein $Z_1$ and $Z_2$ are each a nonmetallic atom group necessary to complete a 5- or 6-membered nitrogen-containing ring; $R_1$ and $R_2$ are each an alkyl group, an alkenyl group, or an aralkyl group; L is a linkage group, in which 5, 7 or 9 methine groups are linked with each other through conjugated double bonds; a, b and c are each 0 or 1; and $X^-$ is an anion;

formula (II)

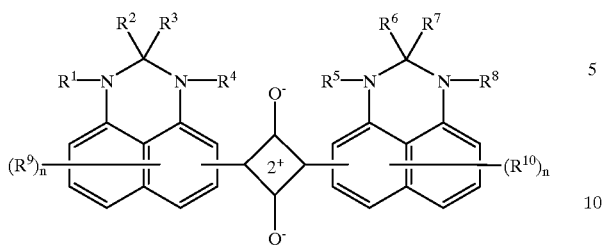

wherein $R^1$, $R^4$, $R^5$ and $R^8$ are each a hydrogen atom, an alkyl group, a cycloalkyl group, or an aryl or aralkyl group; $R^2$, $R^3$, $R^6$ and $R^7$ are each a hydrogen atom, an alkyl group having 1 to 20 carbon atoms, a cycloalkyl group, an aryl group, a heterocyclic group or an aralkyl group, —$CH_2OR$, in which R is an alkylacyl group, —$C(=O)R'$, —$SiR''R'''R''''$ or —$SO_2R''''$, in which R', R'', R''', R'''' and R''''' are each an alkyl group, or $R^1$ and $R^2$, $R^3$ and $R^4$, $R^5$ and $R^6$, $R^7$ and $R^8$, or $R^2$ and $R^3$, or $R^6$ and $R^7$ combine together with each other to form a 5-, 6- or 7-membered ring; $R^9$ and $R^{10}$ are each a univalent group; and n is an integer of 1 to 3;

3. The photothermographic material described in 1., wherein the infrared absorbing compound is a water-soluble infrared absorbing compound;
4. The photothermographic material described in 1., wherein the infrared absorbing compound is a compound represented by formula (I):
formula (I)

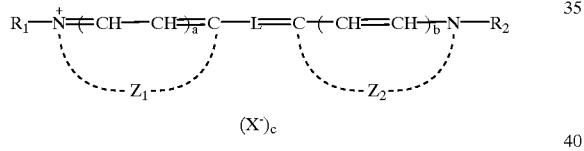

wherein $Z_1$ and $Z_2$ are each a nonmetallic atom group necessary to complete a 5- or 6-membered nitrogen-containing ring; $R_1$ and $R_2$ are each an alkyl group, an alkenyl group, or an aralkyl group; L is a linkage group, in which 5, 7 or 9 methine groups are linked with each other through conjugated double bonds; a, b and c are each 0 or 1; and $X^-$ is an anion;
5. The photothermographic material described in 1., wherein the infrared absorbing compound is a compound represented by formula (II):
formula (II)

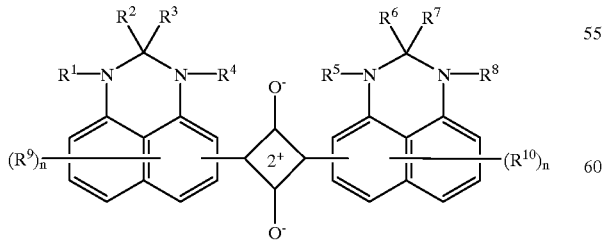

wherein $R^1$, $R^4$, $R^5$ and $R^8$ are each a hydrogen atom, an alkyl group, a cycloalkyl group, or an aryl or aralkyl group; $R^2$, $R^3$, $R^6$ and $R^7$ are each a hydrogen atom, an alkyl group, a cycloalkyl group, an aryl group, a heterocyclic group or an aralkyl group, —$CH_2OR$, in which R is an alkylacyl group, —$C(=O)R'$, —$SiR''R'''R''''$ or —$SO_2R''''$, in which R', R'', R''', R'''' and R''''' are each an alkyl group, provided that $R^1$ and $R^2$, $R^3$ and $R^4$, $R^5$ and $R^6$, $R^7$ and $R^8$, or $R^2$ and $R^3$, or $R^6$ and $R^7$ may combine together with each other to form a 5-, 6- or 7-membered ring; $R^9$ and $R^{10}$ are each a univalent group; and n is an integer of 1, 2 or 3;

6. The photothermographic material described in 1., wherein the infrared absorbing compound is contained in an amount of 0.1 to 1000 mg/m$^2$;
7. The photothermographic material described in 1., wherein the infrared absorbing compound is a copper-containing phosphate compound;
8. The photothermographic material described in 4., wherein the infrared absorbing compound is a compound represented by formula (I-1) or (I-2):
formula (I-1)

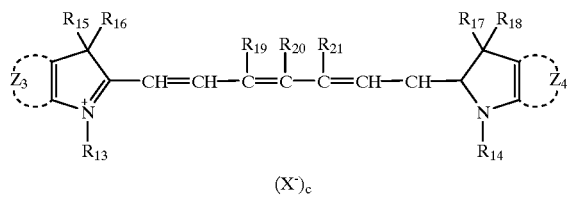

wherein $Z_3$ and $Z_4$ are each the group of atoms necessary to form a fused benzo- or naphtha-ring; $R_{13}$ and $R_{14}$ are each an alkyl group, an aralkyl group or alkenyl group; $R_{19}$ and $R_{21}$ are each the group of atoms necessary to form a 5- or 6-membered ring by combining with each other; $R_{20}$ is a hydrogen atom, an alkyl group, a halogen atom, an aryl group, $NR_{22}R_{23}$, $SR_{24}$ or $OR_{24}$, in which $R_{22}$, $R_{23}$ and $R_{24}$ are each an alkyl group or aryl group, provided that $R_{22}$ and $R_{23}$ may combine with each other to form a 5- or 6-membered ring; $R_{15}$, $R_{16}$, $R_{17}$ and $R_{18}$ are each an alkyl group, provided that $R_{15}$ and R16, or $R_{17}$ and $R_{18}$ combine with each other to form a ring; $X^-$ is an anion; and c is 0 or 1;

formula (I-2)

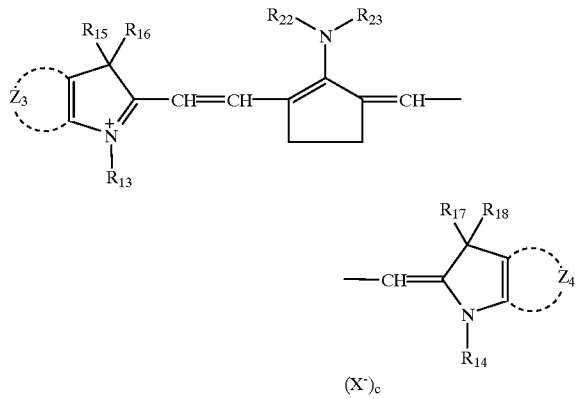

wherein $Z_3$ and $Z_4$ are each the group of atoms necessary to form a fused benzo- or naphtho-ring;

$R_{13}$ and $R_{14}$ are each an alkyl group, an aralkyl group or alkenyl group; $R_{22}$ and $R_{23}$ are each an alkyl group or an aryl group; $R_{15}$, $R_{16}$, $R_{17}$ and $R_{18}$ are each an alkyl group, provided that $R_{15}$ and $R_{16}$, or R17 and $R_{18}$ may combine with each other to form a 5- or 6-membered ring; $X^-$ is an anion and c is 0 or 1;

9. The photothermographic material described in 4., wherein the infrared absorbing compound is a copper-containing phosphate compound exhibiting a molar ratio of copper as calculated in terms of CuO to phosphate in terms of $P_2O_5$, $CuO/P_2O_5$ of 0.05 to 4;

10. The photothermographic material described in 1., wherein a layer containing said infrared absorbing compound is between the support and an emulsion layer and adjacent to the emulsion layer;

11. The photothermographic material described in 5., wherein in the formula, $R^1$, $R^4$, $R^5$ and $R^8$ are each a hydrogen atom, an alkyl group having 1 to 20 carbon atoms, a cycloalkyl group having 3 to 20 carbon atoms, or an aryl having not more than 14 carbon atoms or aralkyl group; $R^2$, $R^3$, $R^6$ and $R^7$ are each a hydrogen atom, an alkyl group having 1 to 20 carbon atoms, a cycloalkyl group having 3 to 20 carbon atoms, an aryl having not more than 14 carbon atoms, a heterocyclic group or an aralkyl group, —CH$_2$OR, in which R is an alkylacyl group, —C(=O)R', —SiR"R'"R"" or —SO$_2$R"", in which R', R", R"' R"" and R""' are each an alkyl group having 1 to 20 carbon atoms, or $R^1$ and $R^2$, $R^3$ and $R^4$, $R^5$ and $R^6$, $R^7$ and $R^8$, or $R^2$ and $R^3$, or $R^6$ and $R^7$ combine together with each other to form a 5-, 6- or 7-membered ring; $R^9$ and $R^{10}$ are each a univalent group; and n is an integer of 1 to 3, with proviso that when $R^2$, $R^3$, $R^6$ and $R^7$ are each a heterocyclic group, $R^9$ and $R^{10}$ may be a hydrogen atom;

12. The photothermographic material described in 5., wherein said infrared absorbing compound is a compound represented by formula (III), (IV) or (V):

formula (III)

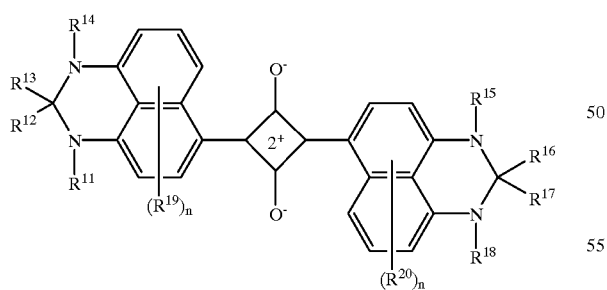

wherein $R^{11}$, $R^{14}$, $R^{15}$ and $R^{18}$ are each a hydrogen atom, an alkyl group, a cycloalkyl group, or an aryl or aralkyl group; $R^{12}$, $R^{13}$, $R^{16}$ and $R^{17}$ are hydrogen atom, alkyl a cycloalkyl group, an aryl group, a heterocyclic group, an aralkyl group, —CH$_2$OR, in which R is an alkylacyl group, —C(=O)R', —SiR"R'"R"", or —SO$_2$R"" in which R', R", R"', R"" and R""' are each an alkyl group, provided that $R^{11}$ and $R^{12}$, $R^{13}$ and $R^{14}$, $R^{15}$ and $R^{16}$, $R^{17}$ and $R^{18}$, $R^{12}$ and $R^{13}$, or $R^{16}$ and $R^{17}$ may combine with each other to form a 5-, 6- or 7-membered ring; $R^{19}$ and R are each a univalent group; and n is an integer of 1, 2 or 3;

formula (IV)

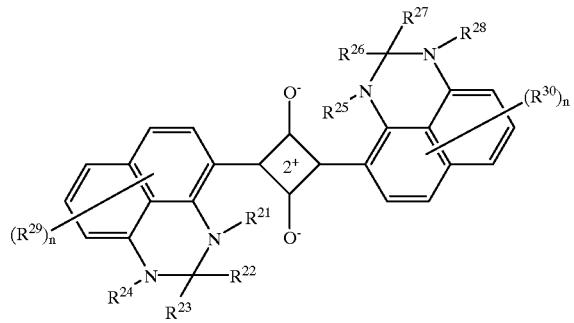

wherein $R^{21}$, $R^{24}$, $R^{25}$, and $R^{28}$ are each a hydrogen atom, an alkyl group, a cycloalkyl group, an aryl group or an aralkyl group, $R^{22}$, $R^{23}$, $R^{26}$ and $R^{27}$ are each a hydrogen atom, an alkyl group, a cycloalkyl group, an aryl group, a heterocyclic group or an aralkyl group, provided that $R^{21}$ and $R^{22}$, $R^{23}$ and $R^{24}$, $R^{25}$ and $R^{26}$, $R^{27}$ and $R^{28}$, $R^{22}$ and $R^{23}$, or $R^{26}$ and $R^{27}$ may combine with each other to form a 5- or 6-membered ring; $R_{29}$ and $R_{30}$ are each a hydrogen atom or a univalent group; n is an integer of 1, 2 or 3; and formula (V)

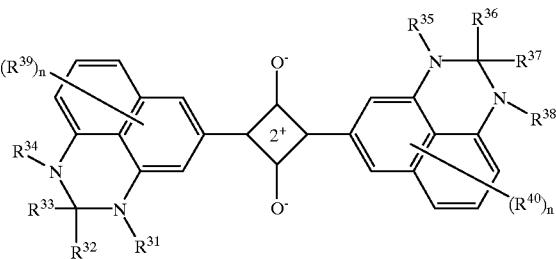

wherein $R^{31}$, $R^{34}$, $R^{35}$ and $R^{38}$ are each a hydrogen atom, an alkyl group, a cycloalkyl group, an aryl group or an aralkyl group, $R^{32}$, $R^{33,}$ $^{R36}$ and $R^{37}$ are each a hydrogen atom, an alkyl group, a cycloalkyl group, an aryl group, a heterocyclic group or an aralkyl group, provided that $R^{31}$ and $R^{32}$, $R^{33}$ and $R^{34}$, $R^{35}$ and $R^{36}$, $R^{37}$ and $R^{38}$, $R^{32}$ and $R^{33}$, or $R^{36}$ and $R^{37}$ may combine with each other to form a 5- or 6-membered ring; $R^{39}$ and $R^{40}$ are each a hydrogen atom or a univalent group; and n is an integer of 1, 2 or 3;

13. The photothermographic material described in 1., wherein the sublayer contains a binder, the binder being comprised of at least two kinds of polymers and the difference in glass transition temperature between the two kinds of polymers is 10 to 80° C.;

14. The photothermographic material described in 10., wherein the infrared absorbing compound is a compound represented by formula (I), in an amount of 0.1 to 1000 mg/m$^2$:

formula (I)

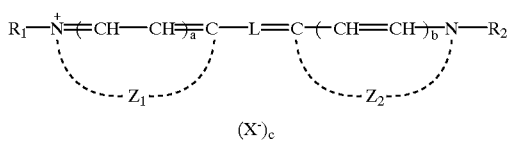

(X$^-$)$_c$ wherein $Z_1$ and $Z_2$ are each a nonmetallic atom group necessary to complete a 5- or 6-membered nitrogen-containing ring; $R_1$ and $R_2$ are each an alkyl group having 1 to 20 carbon atoms, an alkenyl group having 2 to 6 carbon atoms, or an aralkyl group having 7 to 12 carbon atoms; L is a linkage group, in which 5, 7 or 9 methine groups are linked with each other through conjugated double bonds; a, b and c are each 0 or 1; and X is an anion;

15. The photothermographic material described in 10., wherein said infrared absorbing compound is a compound represented by formula (II), in an amount of 0.1 to 1000 mg/m$^2$:

formula (II)

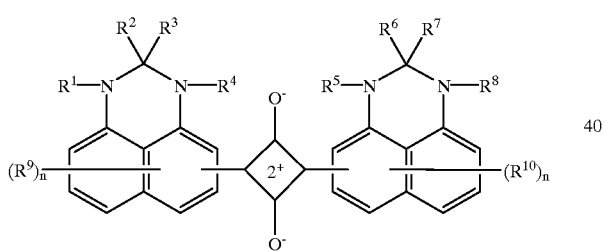

wherein $R^1$, $R^4$, $R^5$ and $R^8$ are each a hydrogen atom, an alkyl group having 1 to 20 carbon atoms, a cycloalkyl group having 3 to 20 carbon atoms, or an aryl having not more than 14 carbon atoms or aralkyl group; $R^2$, $R^3$, $R^6$ and $R^7$ are each a hydrogen atom, an alkyl group having 1 to 20 carbon atoms, a cycloalkyl group having 3 to 20 carbon atoms, an aryl having not more than 14 carbon atoms, a heterocyclic group or an aralkyl group, —CH$_2$OR, in which R is an alkylacyl group, —C(=O)R', —SiR"R'"R"" or —SO$_2$R"", in which R', R", R'", R"" and R""' are each an alkyl group having 1 to 20 carbon atoms, provided that $R^1$ and $R^2$, $R^3$ and $R^4$, $R^5$ and $R^6$, $R^7$ and $R^8$, or $R^2$ and $R^3$, or $R^6$ and $R^7$ may combine together with each other to form a 5-, 6- or 7-membered ring; $R^9$ and $R^{10}$ are each a univalent group; and n is an integer of 1, 2 or 3;

16. The photothermographic material described in 15., wherein the infrared absorbing compound is a compound represented by formula (III), (IV) or (V):

formula (III)

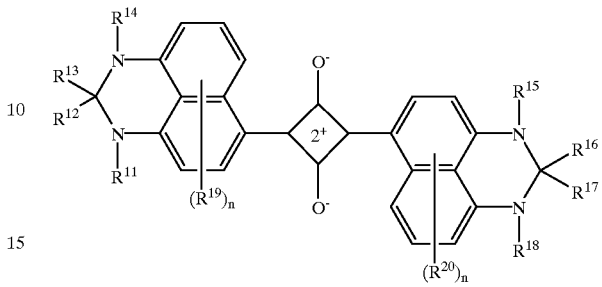

wherein $R^{11}$, $R^{14}$, $R^{15}$ and $R^{18}$ are each a hydrogen atom, an alkyl group having 1 to 20 carbon atoms, a cycloalkyl group having 3 to 20 carbon atoms, or an aryl having not more than 14 carbon atoms or aralkyl group; $R^{12}$, $R^{13}$, $R^{16}$ and $R^{17}$ are each a hydrogen atom, an alkyl group having 1 to 20 carbon atoms, a cycloalkyl group having 3 to 20 carbon atoms, an aryl group having not more than 14 carbon atoms, a heterocyclic group, an aralkyl group, —CH$_2$OR, in which R is an alkylacyl group, —C(=O)R', —SiR"R'"R"", or —SO$_2$R"" in which R', R", R'", R"" and R""' are each an alkyl group having 1 to 20 carbon atoms, provided that $R^{11}$ and $R^{12}$, $R^{13}$ and $R^{14}$, $R^{15}$ and $R^{16}$, $R^{17}$ and $R^{18}$, $R^{12}$ and $R^{13}$, or $R^{16}$ and $R^{17}$ may combine with each other to form a 5-, 6- or 7-membered ring; $R^{19}$ and $R^{20}$ are each a univalent group; and n is an integer of 1, 2 or 3;

formula (IV)

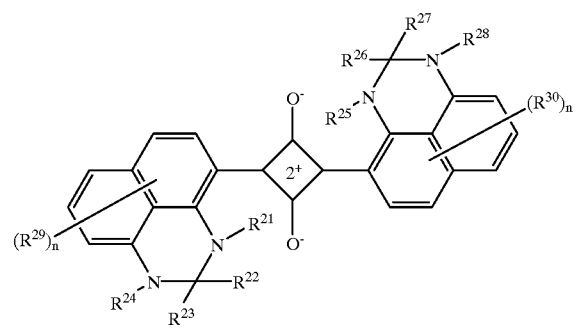

wherein $R^{21}$, $R^{24}$, $R^{25}$ and $R^{28}$ are each a hydrogen atom, an alkyl group having 1 to 20 carbon atoms, a cycloalkyl group having 3 to 20 carbon atoms, an aryl group having not more than 14 carbon atoms, or an aralkyl group, $R^{22}$, $R^{23}$, $R^{26}$ and $R^{27}$ are each a hydrogen atom, an alkyl group having 1 to 20 carbon atoms, a cycloalkyl group having 3 to 20 carbon atoms, an aryl group having not more than 14 carbon atoms, a heterocyclic group or an aralkyl group, provided that $R^{21}$ and $R^{22}$, $R^{23}$ and $R^{24}$, $R^{25}$ and $R^{26}$, $R^{27}$ and $R^{28}$, $R^{22}$ and $R^{23}$, or $R^{26}$ and $R^{27}$ may combine with each other to form a 5- or 6-membered ring; $R_{29}$ and $R_{30}$ are each a hydrogen atom or a univalent group; n is an integer of 1, 2 or 3; and formula (V)

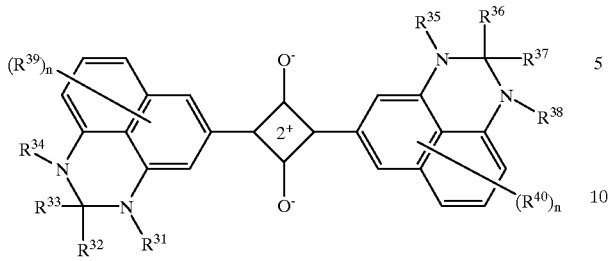

wherein $R^{31}$, $R^{34}$, $R^{35}$ and $R^{38}$ are each a hydrogen atom, an alkyl group having 1 to 20 carbon atoms, a cycloalkyl group having 3 to 20 carbon atoms, an aryl group having not more than 41 carbon atoms or an aralkyl group, $R^{32}$, $R^{33}$, $R^{36}$ and $R^{37}$ are each a hydrogen atom, an alkyl group having 1 to 20 carbon atoms, a cycloalkyl group having 3 to 20 carbon atoms, an aryl group having not more than 41 carbon atoms, a heterocyclic group or an aralkyl group, provided that $R^{31}$ and $R^{32}$, $R^{33}$ and $R^{34}$, $R^{35}$ and $R^{36}$, $R^{37}$ and $R^{38}$, $R^{32}$ and $R^{33}$, or $R^{36}$ and $R^{37}$ may combine with each other to form a 5- or 6-membered ring; $R^{39}$ and $R^{40}$ are each a hydrogen atom or a univalent group; and n is an integer of 1, 2 or 3.

DETAILED DESCRIPTION OF THE INVENTION

The infrared absorbing compound exhibiting the absorption maximum at a wavelength of 700 to 900 nm, used in this invention, includes any infrared absorbing compound exhibiting the absorption maximum within this range, such as polymethine dyes and squarylium dyes described in JP-A 59-6481 and 59-182436; U.S. Pat. No. 4,271,263; European Patent 533,008 and 652,473; JP-A 2-216140, 4-348339, 7-191432, 7-301890, 9-230531, 10-104779, 10-104785; and Tokuhyohei 9-509503.

The infrared absorbing compound used in the invention is a water-soluble infrared absorbing compound, a polymethine dye represented by formula (I), a aquarylium dye represented by formula (II), a copper-containing phosphate compound or a metal oxide. If the water-soluble infrared absorbing compound exhibits characteristics of being soluble in water, the extent of water-solublity of the compound is sufficient in achieving the objects of the invention. Specifically, a compound exhibiting solubility of 0.01 g or more (preferably 0.10 g or more)in 100 g of water at 20° C. is preferred. The water-soluble infrared absorbing compound is preferably a compound represented by formula (I).

The dye represented by formula (I) will be further described.

formula (I)

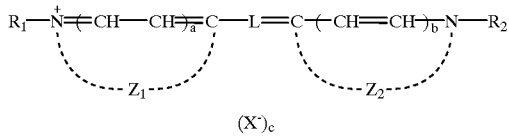

wherein $Z_1$ and $Z_2$ are each the group of nonmetallic atoms necessary to complete a 5- or 6-membered nitrogen-containing ring; $R_1$ and $R_2$ are each an alkyl group, an alkenyl group, or an aralkyl group; L is a linking group connecting methine groups so that 5, 7 or 9 methine groups are linked with each other through conjugated double bonds; a, b and c are each 0 or 1; and $X^-$ is an anion. Exemplary examples of the 5- or 6-membered nitrogen-containing ring represented by $Z_1$ and $Z_2$, which may be fused, include an oxazole ring, isooxazole ring, benzoxazole ring, naphthooxazole ring, thiazole ring, benzthiazole ring, naphthothiazole ring, indolenine ring, benzindolenine ring, imidazole ring, benzimidazole ring, naphthoimidazole ring, imidazoquinooxaline ring, quinoline ring, pyridine ring, pyrrolopyridine ring, and flopyrrole ring. A 5-membered nitrogen-containing ring which is condensed with a benzene or naphthalene ring is preferred and a indolenine ring is more preferred. These rings may be substituted. Examples of substituents include an alkyl group (e.g., methyl, ethyl), an alkoxy group (e.g., methoxy, ethoxy), an aryloxy group (e.g., unsubstituted phenoxy, p-chlorophenoxy), a halogen atom (e.g., chlorine, bromine, fluorine), an alkoxycarbonyl group (e.g., ethoxycarbonyl), cyano group, and nitro group. Specifically are preferred a unsubstituted indolenine ring or indolenine ring substituted by a chlorine atom, methoxy or methyl.

The alkyl group represented by $R_1$ or $R_2$ is preferably one having 1 to 20 carbon atoms, and more preferably 1 to 8 carbon atoms (e.g., methyl, ethyl, propyl, butyl, isobutyl, pentyl, hexyl), which may be substituted by a halogen atom (e.g., fluorine, chlorinr, bromine), an alkoxycarbonyl group (e.g., methoxycarbonyl, ethoxycarbonyl), or hydroxy. The aralkyl group represented by $R_1$ or $R_2$ is preferably one having 7 to 12 carbon atoms (e.g., benzyl, phenethyl), which may be substituted by a substituent (e.g., methyl, alkoxy, chlorine). The alkenyl group represented by $R_1$ or $R_2$ is preferably one having 2 to 6 carbon atoms (e.g., 2-pentenyl, vinyl, allyl, 2-butenyl, 1-propenyl).

L is a linkage group comprised of five, seven or nine methine groups, which are linked with each other through conjugated double bonds. The number of the methine group is preferably seven (i.e., heptamethine). The methine group may be substituted, and the substituted methine group is preferably one at the meso-position. L is preferably $L_5$ (pentamethine), $L_7$ (heptamethine) or $L_9$ (nanomethine) represented as follows:

$L_5$:

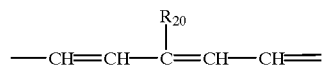

$L_7$:

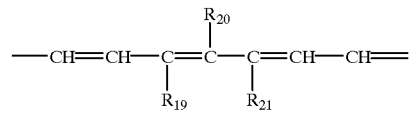

$L_9$:

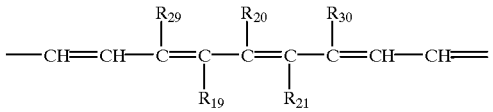

wherein $R_{20}$ is a hydrogen atom, an alkyl group, a halogen atom, an aryl group, $NR_{22}R_{23}$, or $SR_{24}$, in which $R_{22}$, $R_{23}$ and $R_{24}$ are each an alkyl group or an aryl group, and $R_{22}$ and $R_{23}$ may combine with each other to form a heterocyclic ring (e.g., piperidine, morpholine); $R_{19}$ and $R_{21}$ are hydrogen atom or atomic groups necessary to complete a 5- or 6-membered ring by combination thereof; $R_{29}$ and $R_{30}$ are a hydrogen atom or an alkyl group. $R_{19}$ and $R_{21}$ preferably combine together with each to form a 5- or 6-membered ring, such as a cyclopentenone ring or cyclohexene ring, which may be substituted by a substituent (e.g., alkyl, aryl). The alkyl group described above is the same as defined in $R_1$ and $R_2$. The halogen atom described above include fluorine, chlorine and bromine. The aryl group described above is preferably one having 6 to 12 carbon atoms, including phenyl and naphthyl. The aryl group may be substituted, and examples of substituents include an alkyl group having 10 or less, and preferably 6 or less carbon atoms (e.g., methyl, ethyl, butyl, hexyl), an alkoxy group having 10 or less, and preferably 6 or less carbon atoms (e.g., methoxy, ethoxy), an aryloxy group having 20 or less, and preferably 12 or less carbon atoms (e.g., phenoxy, p-chlorophenoxy), a halogen atom (e.g., fluorine, chlorine, bromine), an alkoxycarbonyl group having 10 or less, and preferably 6 or less carbon atoms (e.g., ethoxycarbonyl), cyano group, nitro group, and carbonyl group.

To enhance water-solubility, an acid moiety such as carboxylic acid, sulfinic acid, phosphonic acid or their salts, or a sulfonamide or carboamide group may be contained.

In formula (I), a, b and c are each 0 or 1, and a and b are each preferably 0 and c is preferably 1, provided that when an anionic substituent such as a carboxy or sulfon group and $N^+$ form an intramolecular salt, c is 0. Examples of anions represented by $X^-$ include a halide ion (e.g., chlorine, bromine, iodine), p-toluenesulfonate ion, ethylsulfate ion, $pF6^-$, $BF4^-$, $C104^-$ and an anion represented by the following formula:

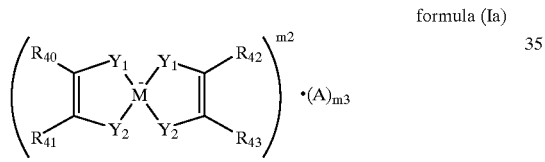

formula (Ia)

wherein $R_{40}$, $R_{41}$, $R_{42}$ and $R_{43}$ are each a hydrogen atom, an alkyl group, an aryl group, cyano, or a non-metallic atom group necessary to form an aromatic ring by combining $R_{40}$ with $R_{41}$ or by combining $R_{42}$ with $R_{43}$; Y1 and Y2 are each O, S or NH; M is a metal atom including Ni, Co, Cu, Pt, Pd, Fe, Mn and Zn; A is a quaternary ammonium salt or quaternary pgosphonium salt; m2 is 0, −1 or −2, and m3 is 0, 1 or 2, provided that when m2 0, m3 is 0, when m2 is −1, m3 is 1 and m2 is −2, m3 is 3. The alkyl group represented by $R_{40}$, $R_{41}$, $R_{42}$ and $R_{43}$ is the same as defined in R1 and $R_2$, and the aryl group represented by $R_{40}$, $R_{41}$, $R_{42}$ and $R_{43}$ is the same as defined in $R_{20}$. The aromatic group formed by combining $R_{40}$ with $R_{41}$ or by combining $R_{42}$ with $R_{43}$ include, for example, a phenyl group and naphthyl group, which may be substituted by a substituent, such as methyl, t-butyl, methoxy, or chlorine. The ammonium salt represented by A include, for example, tetramethylammonium, tetraethylammonium, tetrabutylammonium, octyltriethylammonium, phenyltrimethylammonium, phenyltrimethylammonium, phenyltriethylammonium, triphenylbutylammonium, triphenylbenzylammonium, and tetraphenylammonium. The phosphonium salt represented by A include, for example, tetramethylphosphonium, tetraethylphosphonium, tetrabutylphosphonium, octyltriethylphosphonium, phenyltrimethylphosphonium, phenyltrimethylphosphonium, phenyltriethylphosphonium, triphenylbutylphosphonium, triphenylbenzylphosphonium, and tetraphenylphosphonium.

Preferred polymethine dyes used in the invention are compounds, heptamethine dyes, represented by the following formula (I-1):

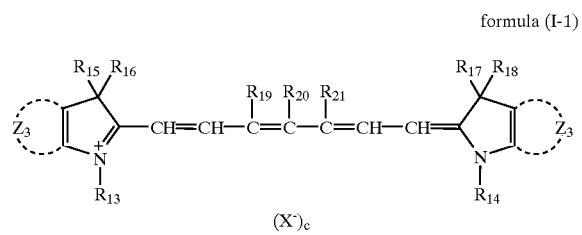

formula (I-1)

wherein $Z_3$ and $Z_4$ are each the group of atoms necessary to form a fused benzo- or naphtha-ring (i.e., a benzene or naphthalene ring fused with a pyrroline ring); $R_{13}$ and $R_{14}$ are each an alkyl group, an aralkyl group or alkenyl group; $R_{19}$ and $R_{21}$ are each the group of atoms necessary to form a 5- or 6-membered ring by combining with each other; $R_{20}$ is a hydrogen atom, an alkyl group, a halogen atom, an aryl group, $NR_{22}R_{23}$, $SR_{24}$ or $OR_{24}$, in which $R_{22}$, $R_{23}$ and $R_{24}$ are each an alkyl group or aryl group, provided that $R_{22}$ and $R_{23}$ may combine with each other to form a 5- or 6-membered ring; $R_{15}$, $R_{16}$, $R_{17}$ and $R_{18}$ are each an alkyl group, provided that $R_{15}$ and $R_{16}$, or $R_{17}$ and $R_{18}$ combine with each other to form a ring; $X^-$ is an anion; and c is 0 or 1.

In formula (I-1), the benzo- or naphtho-fused ring formed by $Z_3$ or $Z_4$ may be substituted by a substituent as defined in $Z_1$. The alkyl group represented by $R_{13}$, $R_{14}$, $R_{15}$, $R_{16}$, $R_{17}$, $R_{18}$, $R_{19}$, $R_{20}$, $R_{21}$, $R_{22}$, $R_{23}$ and $R_{24}$ are, the same as defined in $R_1$ of formula (I). $R_{15}$ and $R_{16}$, or $R_{17}$ and $R_{18}$ may combine with each other to form a ring (such as a cyclohexane ring) The alkenyl or aralkyl group represented by $R_{13}$ and $R_{14}$ is the same as defined in $R_1$ and $R_2$. The aryl group represented by $R_{20}$, $R_{22}$, $R_{23}$ and $R_{24}$ are the same as defined in $R_{20}$ of $L_5$. The halogen atom represented by $R_{20}$ is the same as defined in $R_{20}$ of L5. The ring formed by $R_{22}$ and $R_{23}$ is the same as defined in the ring formation by $R_{22}$ and $R_{23}$ of $L_5$. X and c are the same as defined in formula (I).

Preferred polymethine dyes used in the invention are heptamethine dyes represented by the following formula (I-2):

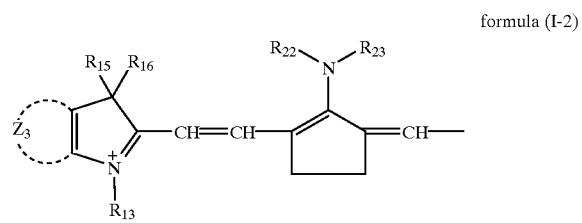

formula (I-2)

-continued

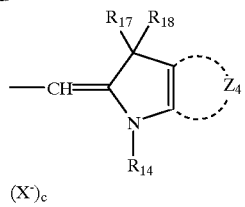

wherein $Z_3$ and $Z_4$ are each the group of atoms necessary to form a fused benzo- or naphtha-ring (i.e., a benzene or naphthalene ring fused with a pyrroline ring); $R_{13}$ and $R_{14}$ are each an alkyl group, an aralkyl group or alkenyl group; $R_{22}$ and $R_{23}$ are each an alkyl group or an aryl group; $R_{15}$, $R_{16}$, $R_{17}$ and $R_{18}$ are each an alkyl group, provided that $R_{15}$ and $R_{16}$, or $R_{17}$ and R may combine with-each other to form a 5- or 6-membered ring; $X^-$ is an anion and c is 0 or 1.

In formula (I-2), the benzo- or naphtho-fused ring formed by $Z_3$ or $Z_4$ may be substituted by a substituent as defined in $Z_1$. The alkyl group represented by $R_{13}$, $R_{14}$, $R_{15}$, $R_{16}$, $R_{17}$, $R_{18}$, $R^{22}$ and $R^{23}$ are the same as defined in $R_1$ of formula (I). $R_{15}$ and $R_{16}$, $R_{17}$ and $R_{18}$ may combine with each other to form a ring (such as a cyclohexane ring). The alkenyl or aralkyl group represented by $R_{13}$ and $R_{14}$ is the same as defined in $R_1$ and $R_2$ of formula (I). The aryl group represented by $R_{22}$ and $R_{23}$ are the same as defined in $R_{20}$ of $L_5$. X and c are the same as defined in formula (I).

Exemplary examples of the infrared absorbing dyes described in (2) are shown below.

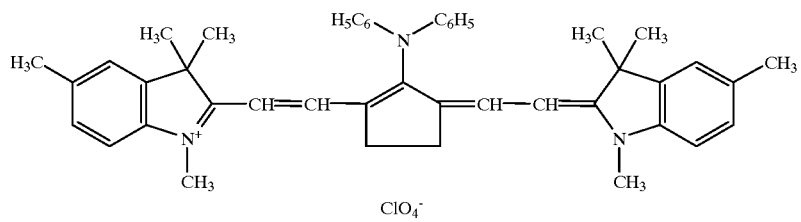

PM-1

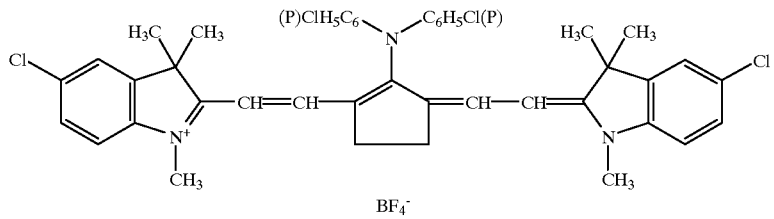

PM-2

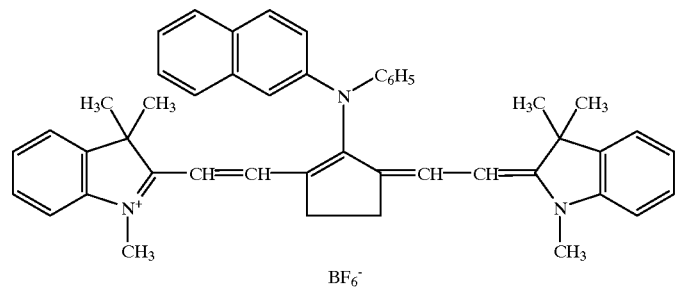

PM-3

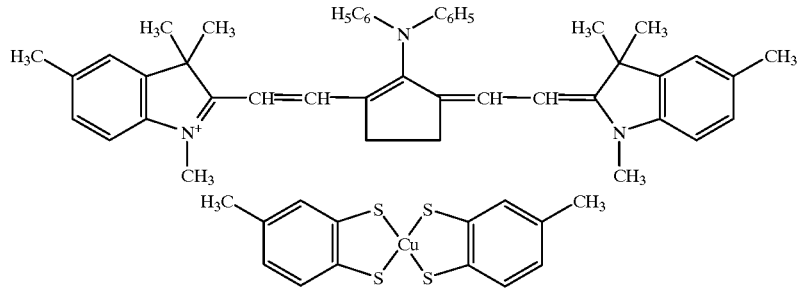

PM-4

-continued

PM-5

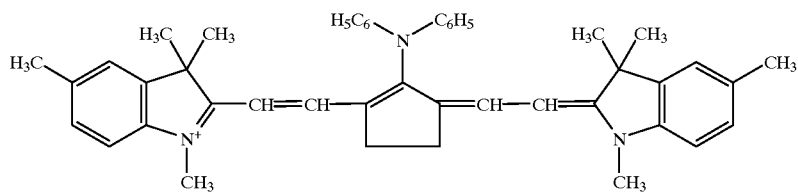

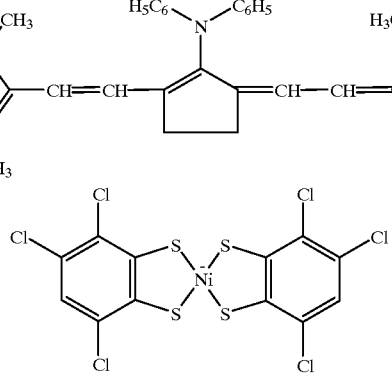

PM-6

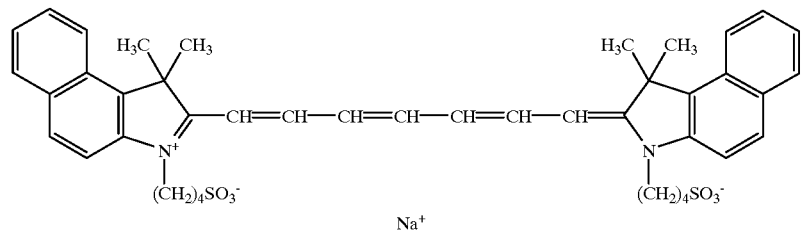

Na⁺

PM-7

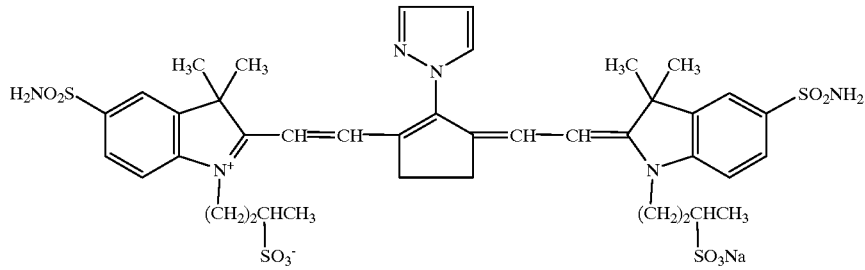

PM-8

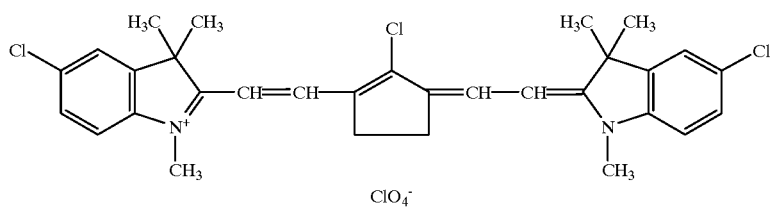

Polymethine dyes used in the invention can be obtained by the conventional method for synthesizing polymethine dyes, as described in U.S. Pat. Nos. 3,671,643 and 2095,854, and JP-A 6-43583.

Synthesis of PM-8

1,2,3,5-tetramethyl-5-chloroindolenium p-toluenesulfonate of 11.4 g, N-(2,5-dianilinomethylenecyclopentylidene)-diphenylalumunum tetrafluoroborate of 7.2 g, 100 ml ethyl alcohol, 6 ml acetic anhydride and 12 ml triethylamine were stirred for 1 hr. at an external temperature of 100° C. and precipitated crystals were fitered out. The precipitates was recrystalized in 100 ml methyl alcohol to obtain 7.3 g of compound PM-3, exhibiting a melting point of not lower than 250° C., ?max of 800.8 nm and e of $2.14 \times 10^5$ (in chloroform).

The polymethine dyes represented by formula (I) may be added into any sublayer and are preferably added to a sublayer provided on the emulsion layer side. In cases where plural sublayers are provided on the emulsion-side, the dye is added preferably to the sublayer nearest to the emulsion layer. The addition amount of the polymethine dye represented by formula (I), depending on the intended purpose, is preferably 0.1 to 1,000 mg/m², and more preferably 1 to 200 mg/m². Incorporation of the polymethine dye represented by formula (I) into the sublayer leads to not only improvements in image sharpness and density unevenness caused by interference fringes but also enhanced dry scratch resistance.

The infrared absorbing squarylium compound represented by formula (II) will be detailed.

formula (II)

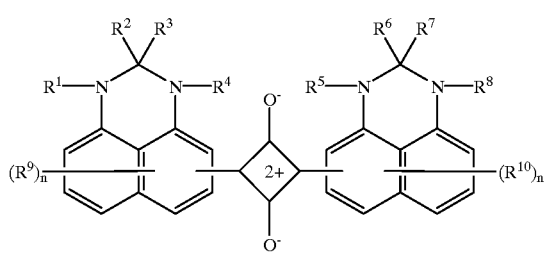

wherein $R^1$, $R^4$ R and $R^8$ are each a hydrogen atom, an alkyl group (preferably having 1 to 20 carbon atoms), a cycloalkyl group (preferably having 3 to 20 carbon atoms), or an aryl (preferably having 14 or less carbon atoms) or aralkyl group; $R^2$, $R^3$, $R^6$ and $R^7$ are each a hydrogen atom, an alkyl group (preferably having 1 to 20 carbon atoms), a cycloalkyl group (preferably having 3 to 20 carbon atoms), an aryl (preferably having 14 or less carbon atoms), a heterocyclic group or aralkyl group, —CH$_2$OR, in which R is an alkylacyl group, —C(=O)R', in which R' is an alkyl group (preferably having 1 to 20 carbon atoms), —SiR"R'"R"", in which R", R'" and R"" are each an alkyl group (preferably having 1 to 20 carbon atoms), or —SO$_2$R"" in which R"" is an alkyl group (preferably having 1 to 20 carbon atoms); $R^9$ and $R^{10}$ are each. a hydrogen atom or a univalent group; and n is an integer of 1, 2 or 3.

The compound represented by formula (II) preferably is represented by the following formula (III), (IV) or (V).

formula (III)

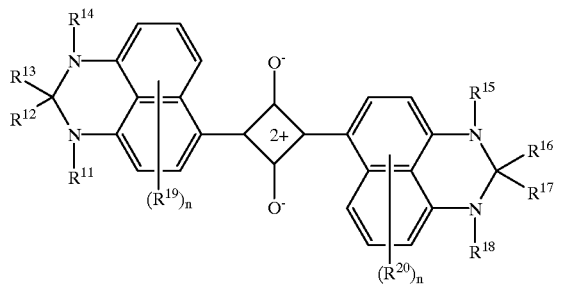

wherein $R^{11}$, $R^{14}$, $R^{15}$ and $R^{18}$ are each a hydrogen atom, an alkyl group (preferably having 1 to 20 carbon atoms), a cycloalkyl group (preferably having 3 to 20 carbon atoms), or an aryl group (preferably having 14 or less carbon atoms) or aralkyl group; $R^{12}$, $R^{13}$, $R^{16}$ and $R^{17}$ are each a hydrogen atom, an alkyl group (preferably having 1 to 20 carbon atoms), a cycloalkyl group (preferably having 3 to 20 carbon atoms), an aryl (preferably having 14 or less carbon atoms), a heterocyclic group or aralkyl group, —CH$_2$OR, in which R is an alkylacyl group, —C(=O)R', in which R' is an alkyl group (preferably having 1 to 20 carbon atoms), —SiR"R'"R"", in which R", R'" and R"" are each an alkyl group (preferably having 1 to 20 carbon atoms), or —SO$_2$R"" in which R"" is an alkyl group (preferably having 1 to 20 carbon atoms), or $R^{11}$ and $R^{12}$, $R^{13}$ and $R^{14}$, $R^{15}$ and $R^{16}$, and/or $R^{17}$ and $R^{18}$ or $R^{12}$ and $R^{13}$ and/or $R^{16}$ and $R^{17}$ may combine with each other to form a 5- 6- or 7-membered ring; $R^{19}$ and $R^{20}$ are each a hydrogen atom or a univalent group; and n is an integer of 1, 2 or 3.

In formula (III), the alkyl group represented by $R^{11}$ to $R^{18}$ preferably is one having 1 to 20 carbon atoms, and more preferably one having 1 to 12 carbon atoms (e.g., methyl, ethyl, propyl, butyl, hexyl, undecyl), which may be substituted by an alkoxycarbonyl group (e.g., methoxycarbonyl, ethoxycarbonyl), hydroxy, alkoxy (e.g., methoxy, ethoxy, isobutoxy, phenoxy) or an acyloxy group (e.g., acetyloxy, butylyloxyhextloxy, benzoyloxy). The cycloalkyl group represented by $R^{11}$ to $R^{18}$ includes cyclopentyl and cyclohexyl. The aryl group represented by $R^{11}$ to $R^{18}$ includes phenyl or naphthyl, which may be substituted by a substituent, including an alkyl group having 1 to 8 carbon atoms (e.g., methyl, ethyl), an aryloxy group (e.g., phenoxy, p-chlorophenoxy), halogen atom (e.g., fluorine, chlorine, bromine), an alkoxycarbonyl (e.g., methoxycarbonyl, ethoxycarbonyl), cyano group, nitro group and carboxy group. $R^{11}$, $R^{14}$, $R^{15}$ and $R^{18}$ preferably are each a hydrogen atom. $R^{19}$ and $R^{20}$ are each a hydrogen atom or a univalent group; n is an integer of 1, 2 or 3.

Examples of the compounds represented by formula (III) are shown below.

SS-1

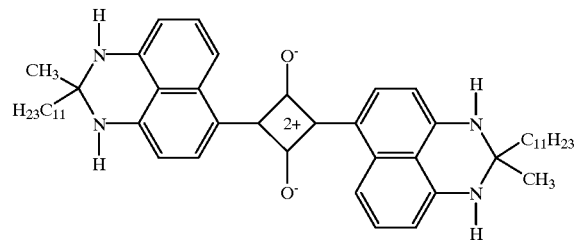

SS-2

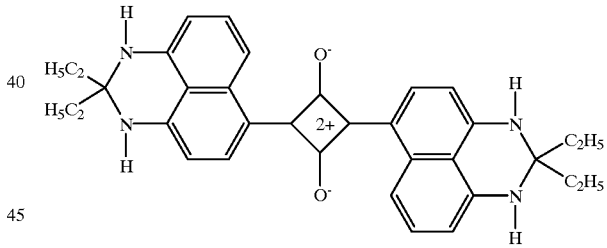

SS-3

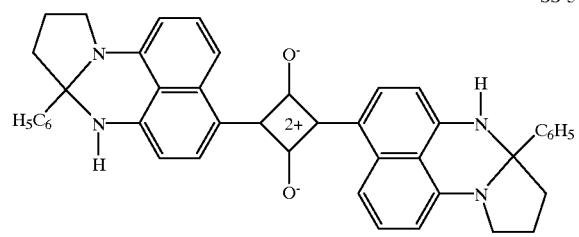

SS-4

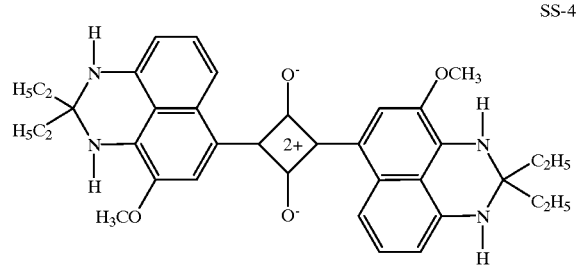

formula (IV)

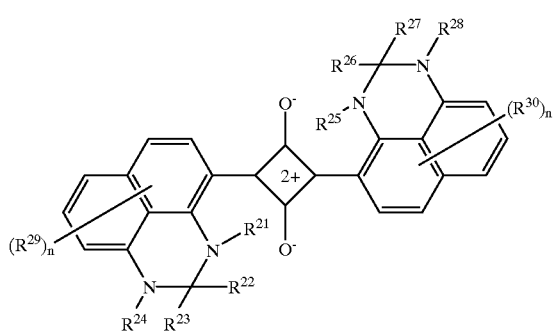

wherein $R^{21}$, $R^{24}$, $R^{25,}$ $^{and}$ $^{R28}$ are each a hydrogen atom, an alkyl group, a cycloalkyl group, an aryl group or an aralkyl group, $R^{22}$, $R^{23}$, $R^{26}$ and $R^{27}$ are each a hydrogen atom, an alkyl group, a cycloalkyl group, an aryl group, a heterocyclic group or an aralkyl group, or $R^{21}$ and $R^{22}$, $R^{23}$ and $R^{24}$, $R^{25}$ and $R^{26}$, $R^{27}$ and $R^{28}$, $R^{22}$ and $R^{23}$ and/or $R^{26}$ and $R^{27}$ may combine with each other to form a 5- or 6-membered ring.

In formula (IV), the alkyl group represented by $R^{21}$ to $R^{28}$ preferably is one having 1 to 20 carbon atoms, and more preferably one having 1 to 12 carbon atoms (e g., methyl, ethyl, propyl, butyl, hexyl, undecyl), which may be substituted by an alkoxycarbonyl group (e.g., methoxycarbonyl, ethoxycarbonyl), hydroxy, alkoxy (e.g., methoxy, ethoxy, isobutoxy, phenoxy) or an acyloxy group (e.g., acetyloxy, butylyloxyhextloxy, benzoyloxy). The cycloalkyl group represented by $R^{21}$ to $R^{28}$ includes cyclopentyl and cyclohexyl. The aryl group represented by $R^{21}$ to $R^{28}$ includes phenyl or naphthyl; which may be substituted by a substituent, including an alkyl group having 1 to 8 carbon atoms (e.g., methyl, ethyl), an aryloxy group (e.g., phenoxy, p-chlorophenoxy), halogen atom (e.g., fluorine, chlorine, bromine), an alkoxycarbonyl (e.g., methoxycarbonyl, ethxoycarbonyl), cyano group, nitro group and carboxy group. $R^{21}$, $R^{24}$, $R^{25}$ and $R^{28}$ preferably are each a hydrogen atom. $R^{29}$ and $R^{30}$ are each a hydrogen atom or a univalent group; n is an integer of 1, 2 or 3.

Examples of compounds represented by formula (IV) are shown below.

SS-5

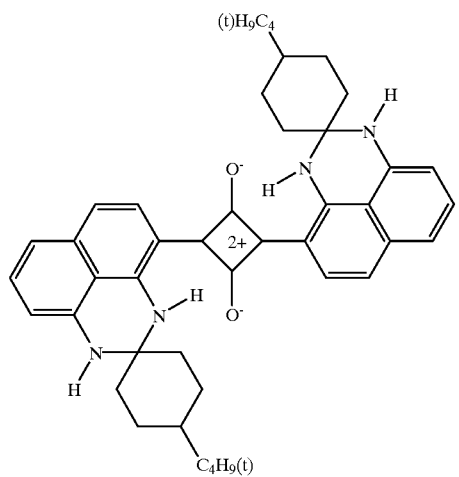

SS-6

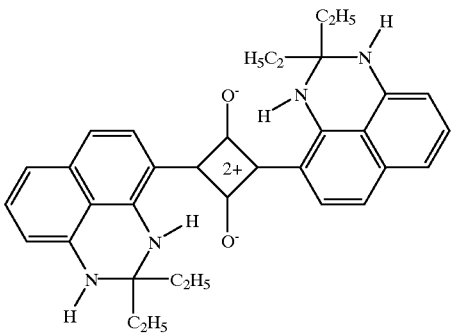

SS-7

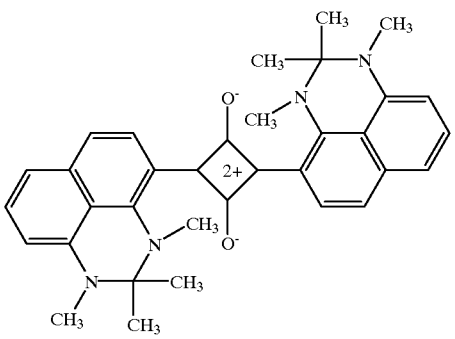

formula (V)

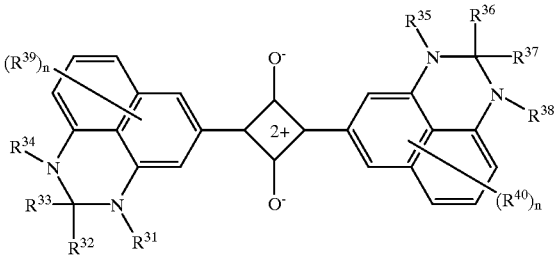

wherein $R^{31}$, $R^{34}$, $R^{35}$ and $R^{38}$ are each a hydrogen atom, an alkyl group, a cycloalkyl group, an aryl group or an aralkyl group, $R^{32}$, $R^{33}$, $R^{36}$ and $R^{37}$ are each a hydrogen atom, an alkyl group, a cycloalkyl group, an aryl group, a heterocyclic group or an aralkyl group, or $R^{31}$ and $R^{32}$, $R^{33}$ and $R^{34}$, $R^{35}$ and $R^{36}$, $R^{37}$ and $R^{38}$, $R^{32}$ and $R^{33}$ and/or $R^{36}$ and $R^{37}$ may combine with each other to form a 5- or 6-membered ring.

In formula (V), the alkyl group represented by $R^{31}$ to $R^{38}$ preferably is one having 1 to 20 carbon atoms, and more preferably one having 1 to 12 carbon atoms (e.g., methyl, ethyl, propyl, butyl, hexyl, undecyl), which may be substituted by an alkoxycarbonyl group (e.g., methoxycarbonyl, ethoxycarbonyl), hydroxy, alkoxy (e.g., methoxy, ethoxy, isobutoxy, phenoxy) or an acyloxy group (e.g., acetyloxy, butylyloxyhextloxy, benzoyloxy). The cycloalkyl group represented by $R^{31}$ to $R^{38}$ includes cyclopentyl and cyclohexyl. The aryl group represented by $R^{31}$ to $R^{38}$ includes phenyl or naphthyl, which may be substituted by a substituent, including an alkyl group having 1 to 8 carbon atoms (e.g., methyl, ethyl), an aryloxy group (e.g., phenoxy, p-chlorophenoxy), halogen atom (e.g., fluorine, chlorine, bromine), an alkoxycarbonyl (e.g., methoxycarbonyl, ethoxycarbonyl), cyano group, nitro group and carboxy group. $R^{31}$, $R^{34}$, $R^{35}$ and $R^{38}$ preferably are each a hydrogen atom. $R^{39}$ and $R^{40}$ are each a hydrogen atom or a univalent group; n is an integer of 1, 2 or 3.

Exemplary examples of compounds represented by formula (V) are shown below.

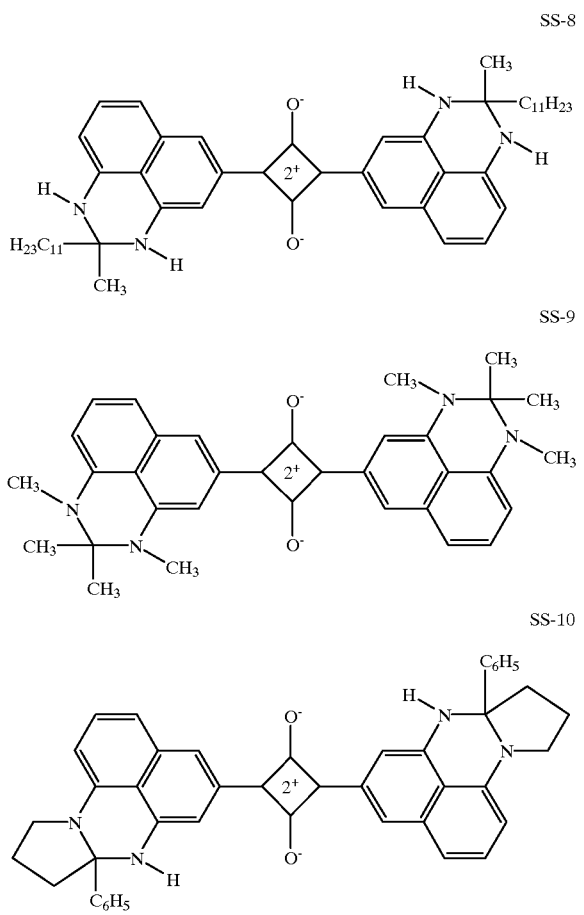

The squarylium dyes used in the invention can be synthesized according to the methods described in Tokuhyohei 9-509503 and JP-A 9-230531.

Synthesis of SS-1

1,8-Diaminonaphthalene of 26.05 g, 32.66 g of 2-tridecanone, 55 mg of p-toluenesulfonic acid monohydrate, and 250 ml of toluene were mixed with stirring. The reaction mixture was refluxed with heating under a nitrogen atmosphere and was allowed to react for 5 hrs. using Dean-Stark trap to remove water from the reaction mixture Thereafter, the mixture was washed with aqueous saturated sodium hydrogen carbonate solution, dried using potassium carbonate anhydride, filtered and solvent was removed under reduced pressure. The product was distilled to obtain 46.50 g of dihydroperimidine intermediate, exhibiting a boiling point of 192 to 213° C./0.3 to 0.4 Torr. The thus prepared dihydroperimidine intermediate of 8.00 g, 1.48 g of squaric acid, 64 ml of n-butanol and 64 ml of toluene were mixed with stirring. The reaction mixture was refluxed with heating under a nitrogen atmosphere and was allowed to react for 3 hrs. using Dean-Stark trap to remove water from the reaction mixture Thereafter, the mixture was filtered, run into petroleum ether and allowed to stand at a temperature of 5° C. for 18 hrs. The product was filtered out, washed with petroleum ether and air-dried to obtain 6.00 g of squarylium dye SS-1. The dye was recrystalized from the mixture of tetrahydrofuran and petroleum ether to refine the product. exhibiting an maximum absorption wavelength (?max) of 802 nm (e=1.8×105) in ethyl acetate.

The squarylium dyes represented by formula (II) may be added into any sublayer and are preferably added to a sublayer provided on the emulsion layer side. In cases where plural sublayers are provided on the emulsion-side, the squarylium dye represented by formula (II) is added preferably to the sublayer nearest to the emulsion layer. The addition amount of the squarylium dye represented by formula (II), depending on the intended purpose, is preferably 0.1 to 1,000 mg/m$^2$, and more preferably 1 to 200 mg/m$^2$. Incorporation of the squarylium dye represented by formula (II) into the sublayer leads to not only improvements in image sharpness and density unevenness caused by interference fringes but also enhanced coatability of an emulsion layer coating solution or a back layer coating solution onto the sublayer surface.

The copper-containing phosphate compound will be further described. The copper-containing phosphate compound was obtained by finely pulverizing a mixture of copper monoxide (CuO) and phosphur pentoxide ($P_2O_5$) according to the method described in JP-A 6-206714. Copper-containing phosphate compounds used in the invention, for example, can be prepared as follows. A copper-containing phosphate compound containing a molar ratio of copper as calculated in terms of CuO to phosphate in terms of $P_2O_5$, $CuO/P_2O_5$ of 0.05 to 4 is pulverized in the presence of water in a wet process to form fine powder. Alternatively, the copper-containing phosphate compound containing a molar ratio of $CuO/P_2O_5$ of 0.05 to 4 is pulverized in a dry process, using a grinding machine without the use of alumina to form the fine powder. The copper containing phosphate compound exhibits absorption in the near-infrared region. In cases where the molar ratio of $CuO/P_2O_5$ is less than 0.05, near-infrared absoption capability is insufficient. The higher the copper content, the higher the near-infrared absorption capability. However, when the molar ration of $CuO/P_2O_5$ is more than 4, the copper containing phosphate compound becomes unstable.

The copper-containing phosphate compounds usable in the invention are not specifically limited, but materials having higher near-infrared absorption capability, for example, include, as copper phosphate, copper metaphosphate, copper pyrophosphate, copper orthophosphate and copper apatite. Copper-containing phosphates containing crystal water are also known. Although these phosphates are not suitable in terms of chemical durability, they are usable according to their usage. The copper-containing phosphate compounds are not limited to crystalline compounds but amorphous compounds such as those in a glass state are also applicable.

A copper-containing phosphate compound prepared in a wet process is pulverized in the presence of water. In cases when being pulverized using an organic solvent such as ethanol, the resulting powder becomes more greenish than in the case of using water. In cases when being pulverized using water to form a powder having an average particle size of not more than 10 μm, there is no specific limitation with respect to material used in a pulverizer or a grinding machine. For example, an alumina ball mill, zirconia ball mill, resin ball mill, agate ball mill and various kinds of aqua-mizers can be optionally employed in accordance with the intended fine particle size.

A copper-containing phosphate compound prepared in a dry process is pulverized using a non-alumina grinding machine to prevent contamination with alumina. In cases when being pulverized by an alumina ball mill, the resulting fine powder turns greenish. For example, a zirconia ball mill, agate ball mill and a fluidized bed type counter-jet mill can be employed as a non-alumina grinding machine.

Preparation examples of copper-containing phosphate compounds are shown below.

Preparation of CP-1

CuO powder and orthophosphoric acid are mixed so that the ratio of $CUO/P_2O_5$ was 2:1. The mixture was hermally treated at a temperature of not lower than 200° C. to prepare a copper containing phosphate compound. The thus prepared copper-containing phosphate compound of 300 g and 300 ml deionized water were put into a 2 lit. alumina ball mill and pulverized in the wet process for a period of 40 hrs., while rotating at a rate of 100 rpm to obtain a slurry. The obtained slurry was put into a polyethylene vat and dried at 150° C. for 12 hrs. using a drier to obtain a white fine powder exhibiting an average particle size of 2.8 $\mu$m. The aqueous dispersion exhibited a ?max of 805 nm. The powder is preferably colorless and as fine as possible. Even in cases where being slightly colored, to the extent that there is no influence on the final photothermographic material is acceptable in practical uses.

The copper-containing phosphate compound may be added into any sublayer and are preferably added to a sublayer provided on the emulsion layer side. In cases where plural sublayers are provided on the emulsion-side, the compound is added preferably to the sublayer nearest to the emulsion layer. The addition amount of the copper-containing phosphate compound, depending on the intended purpose, is preferably 0.1 to 1,000 mg/m$^2$, and more preferably 1 to 200 mg/m$^2$. The copper-containing phosphate compound exhibits conductivity so that incorporation of the compound into the sublayer leads to not only improvements in image sharpness and density unevenness caused by interference fringes but also enhanced adhesion of the emulsion layer to the support.

Fine metal oxide particles exhibiting an absorption maximum at 600 nm or more, used in the invention will be detailed below. The fine metal oxide particles are used as an infrared absorbing material. The fine metal oxide particles exhibit conductivity, allowing it to be employed as an antistatic agent, specifically when being coated on the backing layer side. Thus, even when used for antihalation, antistatic effects are also displayed.

The fine metal oxide particles include, for example, those which easily form a labile ratio compound, such as an oxygen-deficient oxide, a metal-excess oxide, a metal deficient oxide and an oxygen-excess oxide. Of these, preferred compounds are fine metal oxide particles capable of being prepared by various methods. The fine metal oxide particles are generally crystalline metal oxide particles, including ZnO, $TiO_2$, $SnO_2$, $Al_2O_3$, $In_2O_3$, $SiO_2$, MgO, $B_2O$, $MoO_3$ and their composite oxides (such as doping compounds). Of these oxides are preferred ZnO, $TiO_2$ and $SnO_2$ and preferred composite oxides thereof are ZnO and Al or In, $TiO_2$ and Nb or Ta and $SnO_2$ and Sb, Nb or halogen elements, in which a hetero-element is contained preferably in an amount of 0.01 to 30 mol %, and more preferably 0.1 to 10 mol %. Oxygen defects contained in crystals or a small content of a heteroatom acting as a donor results in enhancement of conductivity of the metal oxide. The preparation method of such metal oxides are described in JP-A 56-143430. Although such crystalline fine particles exhibit higher conductivity, it is preferred to employ inorganic colloid in an aqueous colloidal form, in terms of deterioration such as haze and difficulty in dispersion. Herein, the inorganic colloid, as defined in "ENCYCLOPAEDIA CHIMICA" published by Kyoritsu Shuppan, means particles containing $10^5$ to $10^9$ atoms per particle, which are obtained as a metal colloid, an oxide colloid and hydroxide colloid. As metal colloids are used gold, palladium, platinum, silver and sulfur. Metal oxide colloids, metal hydroxide colloids, carbonate colloids and sulfate colloids include, for example, those of Zn, Mg, Si, Ca, Al, Sr, Ba, Zr, Ti, Mn, Fe, Co, Ni, Sn, In, Mo and V. Of these, ZnO, $TiO_2$ and $SnO_2$ are preferred and $SnO_2$ is more preferred. A heteroatom-doped compound is preferred and the heteroatoms described above are preferred. The inorganic colloid particles preferably have an average particle size of 0.001 to 1 $\mu$m.

Preparation of the metal oxide colloid, specifically, colloidal $SnO_2$ sol comprised of stannic oxide is conducted by dispersing superfine $SnO_2$ particles in an appropriate solvent or by employing dispersion reaction of a solvent-soluble tin compound in a solvent.

In the preparation of superfine $SnO_2$ particles, the temperature conditions are critical and a method accompanying a thermal treatment at a high temperature, which results in phenomena such as growth of primary particles and enhancement of crystallinity, is not suitable. In cases when the thermal treatment is unavoidably needed to be conducted, it should be done at a temperature of not higher than 300° C., preferably not higher than 200° C., and more preferably not higher than 150° C. However, heating to 25 to 150° C. is a suitable means for dispersion in a binder. Along with recent advances in techniques for preparing powdery material, preparation methods of superfine particles have been developed, such as spraying a compound prepared in the wet process in an electric furnace and thermal decomposition at a high temperature. However, it is rather difficult to disperse the particles prepared by such methods in a solvent, leading to coagulation of particles and possibly resulting in serious defects when being applied to photothermographic materials. In cases where a solvent of $SnO_2$ sol is hardly miscible with binder, it is necessary to replace the solvent. In such a case is added an optimum amount of a compound superior in miscibility or dispersion stability with the $SnO_2$ sol solvent., subsequently, superfine $SnO_2$ particles are separated from the added compound after being dried at a temperature of not higher than 300° C., preferably not higher than 200° C., and more preferably not higher than 150° C. and are then dispersed in another solvent.

A preparation method employing the decomposition reaction of a solvent-soluble tin compound in a solvent will be described. The solvent-soluble compound includes, for example, compounds containing an oxo-anion, water-soluble tin compounds such as SnCl4, compounds having a structure of $R'_2SnR_2$, $R_3SnX$ or $R_2SnX_2$ (in which R and R' are alkyl and X is an acid group), such as $(CH_3)_3SnCl$.pyridine and $(C_4H_9)_2Sn(O_2CC_2H_5)_2$, organic metal compounds and oxo-salts such as $Sn(SO_4)_2.2H_2O$. Preparation methods of $SnO_2$ sol, using the solvent-soluble tin compound include a physical method such as heating or applying pressure after dissolution in a solvent, a chemical method such as oxidation, reduction or hydrolysis and preparation through an intermediate. In the preparation of $SnO_2$ sol described in JP-B 35-6616, for example, for example, SnCl4 is dissolved in 100 times the volume of distilled water to form a stannic hydroxide precipitate as an intermediate. Further, the reaction mixture is made weakly alkaline by adding aqueous ammonia to dissolve the precipitate and then colloidal $SnO_2$ sol is obtained by heating the solution until no ammonia oder is evident. In this case, water is used as a solvent, but various solvents can be used in accordance with the tin compound, including alcoholic solvents such as methanol, ethanol and isopropanol; ether solvents such as tetrahydrofuran, dioxane and diethyl ether, aliphatic solvents such as hexane and heptane; and aromatic organic solvents such as benzene and pyridine. Solvents are not specifically limited but water or alcohols are preferred. On the way of preparation may be added a compound containing elements except for Sn, such as fluorine-containing compound soluble in a solvent or a compound of a metal capable of forming a tri- or penta-coordinated complex. The fluorine-containing compound soluble in a solvent may be any one of an ionic fluorinated compound and covalent fluorinated compound. Examples thereof include fluorides such as HF, $KHF_2$, $SbF_3$, and $MoF_6$; fluoro-complex anions such as $NH_4MnF_3$ and $NH_4BiF_4$; inorganic molecular fluorides such as $BrF_3$, $SF_4$ and $SF_6$; and organic fluorinated compounds such as $CF_3I$, $CF_3COOH$ and $P(CF_3)_3$. In cases of the solvent being water, the combination of a fluorine-containing compound and a non-volatile acid, such as a combination of $CaF2$ and sulfuric acid is also applicable. The solvent-soluble compound of a metal capable of forming a tri- or penta-coordinated complex includes compounds containing a metal selected from III-group elements of Al, Ga, In and Tl; V-group elements P, As, Sb, and Bi; and transition metals capable of forming a tri- or penta-coordinated complex, such as Nb, V, Ti, Cr, Mo, Fe, Co, and Ni.

Next, preparation of fine metal oxide particles is exemplarily shown below.

Preparation of SN-1

In 1000 g of ethanol were dissolved 65 g of stannic chloride and 1.5 g of antimony trichloride to obtain a homogeneous solution. To this solution, an aqueous 1N sodium hydroxide solution was dropwise added until reached a pH of 3 and co-precipitates of colloidal stannic oxide and antimony oxide were obtained. The thus obtained co-precipitates were allowed to stand at 50° C. for a period of 24 hrs. to obtain a reddish brown colloidal precipitate. The obtained reddish brown precipitate was separated by centrifugal separation. To remove soluble salts, the precipitate was added with water and washed by centrifugal separation. Thus, this procedure was repeated three times to remove soluble salts. The washed colloidal precipitate of 100 g was mixed with 50 g of barium sulfate of an average particle size of 0.3 $\mu$m and sprayed into a calcinations furnace heated to a temperature of 900° C. to obtain a bluish powdery mixture comprised of stannic oxide and barium sulfate, exhibiting an average particle size of 0.1 $\mu$m. To the powdery mixture were added 1250 ml distilled water and 40 ml of 30% aqueous ammonia was added thereto and heated to obtain SN-1 (8 wt % solid) exhibiting a ?max of 795 nm in an aqueous dispersion form.

The fine metal oxide particles exhibiting a ?max of 600 nm or more may be added into any sublayer and are preferably added to a sublayer provided on the emulsion layer side. In cases where plural sublayers are provided on the emulsion-side, the particles are added preferably to the sublayer nearest to the emulsion layer. The addition amount of the metal oxide particles exhibiting a ?max of 600 nm or more, depending on the intended purpose, is preferably 0.1 to 1,000 $mg/m^2$, and more preferably 1 to 200 $mg/m_2$. The fine metal oxide particles exhibiting ?max of 600 nm or more exhibit conductivity so that incorporation of the particles into the sublayer leads to not only improvements in image sharpness and density unevenness caused by interference fringes but also enhanced antistatic property.

In the invention, the infrared absorbing material is incorporated into a sublayer provided on the support of the photothermographic material, leading to antihalation effects.

Supports used in photothermographic materials used in the invention include, for examples, polyethylene terephthalate (hereinafter, also denoted as PET), polyethylene naphthalate (also denoted as PEN), polycarbonate (also denoted as PC), polyethersulfon (also denoted as PES), polyacrylate (also denoted as Par), polyether ether ketone (also denoted as PEEK), polysulfone (also denoted as PSO), polyimide (also denoted as PEI), polyamide (also denoted as Pam), polystyrene (also denoted as PS), and syndiotactic polystyrene (also denoted as SPS).

The main component constituting the support polymer described above may be a copolymer or a polymer blend. The main component is one of constituting components, which accounts for at least 50% by weight as a copolymerization ratio or blending ratio. Any polymer capable of supporting characteristics of the photothermographic material can be used as a support. Of polymers described above, polymers exhibiting a glass transition point (also denoted as Tg) of 100° C. or higher are preferred, including PEN, PC, PES, Par, PEEK, PSO, PI PEI and PAm. These polymers may be a homopolymer, or a copolymer or polymer blend containing these polymers as a main component. Further, PET, PEN, PC and PES including a copolymer or polymer blend mainly containing these polymers are more preferred, and PET and PEN are still more preferred.

As a polymer exhibiting Tg of not lower than 100° C., for example, PEN is a polymer comprised of ethylene glycol and a naphthalenedicarboxylic acid. Examples of the naphthalenedicarboxylic acid include naphthalene-2,6-dicarboxylic acid, naphthalene-2,7-dicarboxylic acid and naphthalene-1,5-dicarboxylic acid. Of these is specifically preferred naphthalene-2,6-dicarboxylic acid. Plural kinds of naphthalene dicarboxylic acids may be mixedly used. In this case, a dicarboxylic acid other than naphthalenedicarboxylic acid may be contained as a third component. Examples of the dicarboxylic acid as the third component include terephthalic acid, isophthalic acid, phthalic acid, diphenylsulfondicarboxylic acid, diphenyletherdicarboxylic acid, diphenylethanedicarboxylic acid, cyclohexanedicarboxylic acid, diphenyldicarboxylic acid, diphenylthioetherdicarboxylic acid, diphenylketonedicarboxylic acid, and phenylindanedicarboxylic acid. Further, a glycol other than ethylene glycol may be contained. Examples of the glycol include propylene glycol, tetramethylene glycol, cyclohexanedimethanol, 2,2-bis(4-hydroxyphenyl)propane, 2,2-bis(4-hydroxyethoxyphenyl)propane, bis(4-hyroxyphenyl)sulfon, bisphenolfluorenedihydroxyethyl ether, dimethylene glycol, neopentyl glycol, hydroquinone and cyclohexanediol. Of polyesters containing the above-described main components are preferred those mainly containing, as a dicaboxylic acid component, terephthalic acid and/or 2,6-naphthalenedicarboxylic acid and, as a diol component, ethylene glycol and/or 1,4-cyclohexanedimethanol, in terms of transparency, mechanical strength and dimensional stability. Further, polyesters mainly comprised of polyethylene terephthalate or polyethylene 2,6-naphthalate, co-polyester comprised of terephthalic acid, 2,6-naphthalenedicarboxylic acid and ethylene glycol and polyesters mainly containing a mixture of the polyesters described above are preferred. When a ethylene terephthalate unit is contained in an amount of at least 70% based on weight of polyester, film highly superior in transparency, mechanical strength and dimensional stability is obtained. As is well known, film mainly containing polyethylene-2,6-naphthalate is superior in mechanical strength and heat resistance to film mainly containing polyethylene terephthalate. The synthesis method of PEN used in the invention is not specifically limited but known preparation methods of PET and PEN are applicable. Examples thereof include direct esterification, in which a dicarboxylic acid component and a diol component are directly esterified, and transesterification, in which a dialkylester of a dicarboxylic acid and a diol are esterified through ester interchange and polymerization is undergone while heating under reduced pressure to remove excess diol. In this case, a transesterification catalyst, a polymerization catalyst or heat-resistance stabilizer may be incorporated. Further, there may be incorporated an anti-coloring agent, nucleating agent, lubricant, stabilizer, anti-blocking agent, UV absorbent, viscosity-adjusting agent, antistatic agent, dye or pigment.

The glass transition temperature (Tg) can be determined using a differential scanning calorimeter. Thus, Tg is determined as an average value of a temperature at which deviation from the base line begins and a temperature at which turning to the base line begins.

The support used in the invention may contains an antioxidant. Antioxidants are not specifically limited with respect to the kind and various kinds thereof may be employed. Examples thereof include hindered phenol type compounds and thioether type compounds. Of these antioxidants are preferred hindered phenol compounds in terms of transparency. The antioxidant is contained preferably in an amount of 0.01 to 2% by weight, and more preferably 0.1 to 0.5% by weight. The content of the antioxidant within this range prevents a density increase in unexposed areas of a photothermographic material (so-called fogging) and haze, leading to supports of superior transparency. The antioxidants may be used alone or in combination. The support may be added with a lubricity-providing material. Means for providing lubricity are not specifically limited, including, for example, an external particle addition method of adding inert inorganic particles, an internal particle deposition method in which catalyst added at the time of polymerization is allowed to deposit and a method in which surfactants are coated on the film surface. Of these is preferred the internal particle deposition method, thereby providing lubricity without deteriorating transparency of the film. Haze of the film is preferably 3% or less, and more preferably 1% or less. In cases where a support with haze of more than 3% is used, images become unsharp. The haze can be measured in accordance with ASTM-D1003-52.

Thickness of the support is not specifically limited but set up so as to have the strength intended for usage. In cases of photothermographic materials used in medical diagnostic and printing, the thickness is preferably 50 to 250 $\mu$m, and more preferably 70 to 200 $\mu$m.

The sublayer containing an infrared absorbing compound will be described with respect to materials, constitution, preparation methods, and treatments of the sublayer.

To provide a photosensitive layer or a backing layer on the support of silver halide photothermographic materials, it is necessary to provide a sublayer (or subbing layer), as an adhesive layer on the support. Further, to allow the sublayer to be easily adhered to the support, the support may be subjected, before or after being subbed, to surface treatments, such as a chemical treatment, mechanical treatment, corona discharge treatment, flame treatment, ultraviolet treatment, high-frequency treatment, glow discharge treatment, plasma discharge-in-gas treatment, active plasma treatment, laser treatment, mixed acid treatment, and ozone oxidation treatment. Of these treatments are preferred a corona discharge treatment, glow discharge treatment and plasma discharge-in-gas treatment.

The corona discharge treatment is conducted according to the methods described in JP-B 48-5043 and 47-51905, JP-A 47-28067, 49-83767, 51-41770 and 51-131576. The discharge frequency is preferably 50 to 5,000 kHz, and more preferably 5 to 100 kHz. The treatment intensity to improve surface wettability is preferably 0.001 to 5 kV·A·min/m$^2$, and more preferably 0.01 to 1 kV·A·min/m$^2$. The gap clearance between an electrode and a dielectric roll is preferably 0.5 to 2.5 mm, and more preferably 1.0 to 2.0 mm. The glow discharge treatment is described, for example, in U.S. Pat. Nos. 3,057,792, 3,057,795, 3,719,482, 3,288,638, 3,309,299, 3,424,735, 3,462,335, 3,475,307, and 3,761,299 and British Patent 997,093. Glow discharge is carried out under the condition at a pressure of 0.005 to 20 Torr, and preferably 0.02 to 2 Torr. High voltage is applied between metal plates or metal bars in vacuum to induce discharge. The voltage is variable, depending of the composition of atmospheric gas or pressure. Stationary glow discharge is stably induced within the rang of 500 to 5,000 V and the pressure range described above. The voltage suitable for enhancing adhesion is 2,000 to 4,000 V. The discharge frequency is from direct current to some thousands MHz, and preferably 50 to 20 MHz. The discharge treatment intensity to achieve desired adhesion performance is 0.01 to 5 kV·A·min/m$^2$, and more preferably 0.15 to 1 kV·A·min/m$^2$. With regard to the composition of discharging atmosphere gas, the partial pressure of water vapor is preferably 10 to 100%, and more preferably 40 to 90%. Gas other than water vapor is air comprised of nitrogen and oxygen. Quantitative introduction of water vapor into a glow-discharging atmosphere is achieved in such a manner that gas is introduced through tube provided in the glow discharge apparatus into quadrapole type mass spectrometer MSQ-6150 (available from Nippon Shiku Co. Ltd.) and further introduced to the discharging atmosphere, while quantitatively analyzing the gas composition. When the pre-heated support surface is subjected to the glow discharge treatment, enhancement of adhesive property is achieved by the treatment for a short period, markedly reducing yellowish-coloring of the support. In this case, the preheating temperature is preferably not lower than 50° C. and not higher than the glass transition temperature (Tg9, more preferably not lower than 70° C. and not higher than Tg, and still more preferably not lower than 90° C. and not higher than Tg. The method for raising a polymeric surface temperature include, for example, heating by an infrared heater or heating by bringing into contact with a heated roller. The glow discharge treatment is conducted preferably in such a manner that plural pairs of opposed electrodes which have a refrigerant flow route in the intermediate portion are arranged in the lateral direction of the film support and the support is treated, while being transported. It is preferred that the treated support be immediately cooled using a cooled roller, as described in JP-A 3-39106. The plasma discharge-in-gas treatment is conducted using an apparatus described in Japanese Patent Application No. 10-245151.

Any one of resins commonly used for conventional sublayers can be applicable to the sublayer used in the invention. There are used hydrophilic or hydrophobic copolymers obtained from bi-functional monomers, socalled vinyl monomers, such as acrylic acid or its esters (including methacrylic acid and its esters), vinyl esters, vinylketones, styrenes, diolefins, acrylamides (including methacrylamides), vinyl chlorides (including vinylidene chlorides), and active methylene-containing monomers (e.g., compounds described in U.S. Pat. No. 4,215,195). As monomers of copolymers used in the sublayer relating to the invention, exemplary examples of acrylic acid and its esters (including methacrylic acid and its esters) include methyl acrylate, ethyl acrylate, n-propyl acrylate, isopropyl acrylate, n-butyl acrylate, isobutyl acrylate, t-butyl acrylate, 2-ethylhexyl acrylate, cyclohexyl acrylate, phenyl acrylate, benzyl acrylate, phenyl ethyl acrylate, 2-hydroxyethyl acrylate, 2-hydroxypropyl acrylate, methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, cyclohexyl methacrylate, phenyl methacrylate, benzyl methacrylate, phenyl ethyl methacrylate, 2-hydroxyethyl methacrylate, 2-hydroxypropyl methacrylate, N,N-diethylaminoethyl acrylate, N,N-diethylaminomethacrylate, glycidyl acrylate, glycidyl methacrylate, trifluoroethyl acrylate, trifluorethyl methacrylate, 2,2,3,3-tetrafluoropropyl acrylate, and 2,2,3,3-tetrafluoropropyl methacrylate. Examples of acrylamides and methacrylamides include acrylamide, methacrylamide, N-methylacrylamide, N-methylolacrylamide, N,N-dimethylolacrylamide, N-methoxtmethylacrylamide, N-methylmethacrylamide, N-methylolmethacrylamide, N,N-dimethylolmethacrylamide, N-methoxymethylmethacrylamide, N-methylacrylamide, N-methylolacrylamide, N,N-dimethylolacrylamide, N-methoxymethylacrylamide, N-methylmethacrylamide, N-methylmethacrylamide, N,N-dimethylolmethacrylamide, and N-methoxymethylmethacrylamide. Examples of styrenes include styrene, methylstyrene, dimethylstyrene, ethylstyrene, diethylstyrene, isopropylstyrene, butylstyrene, hexylstyrene, cyclohexylstyrene, decylstyrene, pentylstyrene, chloromethylstyrene, trifluoromethylstyrene, ethoxymethylstyrene, acetoxymethylstyrene, methoxystyrene, 4-methoxy-3-methylstyrene, dimethoxystyrene, chlorostyrene, dichlorostyrene, trichlorostyrene, tetrachlorov, pentachlorostyrene, bromostyrene, dibromostyrene, iodostyrene, fluorostyrene, trifluorov, 2-bromo- 4-trifluoromethylstyrene, 4-fluoro-3-trifluoromethylstyrene, vinylbenzoic acid, methyl vinylbenzoate, and vinylbenzene. Examples of diolefines include conjugated dienes such as butadiene, isoprene and chloroprene; and non-conjugated dienes such as 1,4-pentadiene, 1,4-hexadiene, 3-vinyl-1,5-hexadiene, 1,5-hexadiene, 1,2-divinylcyclobutane, 1,6-heptadiene, 3,5-diethyl-1,5-heptadiene, 4-cyclohexyl-1,6-heptadiene, 3-(4-pentenyl)-1-cyclopentene, 1,7-octadiene, 1,8-nonadiene, 1,9-dediene, 1,9-octadediene, 1-cis-9-cis-1,2-octadecatriene, 1,10-undecadiene, 1,11-dodecadiene, 1,12-tridecadiene, 1,13-tetradecadiene, 1,14-pentadecadiene, 1,15-hexadecadiene, 1,17-octadecadiene and 1,21-docosadiene. Examples of active methylene-containing monomers include acetoacetoxyethyl acrylate, acetoacetoxyethyl methacrylate, N-acetoacetoxyethyl acrylamide, N-acetoacetoxyethyl methacrylamide, N-acetoacetoaminoethyl acrylamide, N-acetoacetoaminoyethyl methacrylamide, N-acetoacetoaminopropyl acrylamide, N-acetoacetoaminoypropyl methacrylamide, acetoacetoxypropyl acrylate, and acetoacetoxypropyl methacrylate. Examples of vinyl esters include vinyl acetate, vinyl butyrate, and vinyl propionate. Further, vinyl chlorides, vinilidene chloride, vinylethylketone, vinylisocyanate, allylisocyanate, and vinyl ethyl ether. Examples of carboxylic acid or its salt monomers include acrylic acid, methacrylic acid, acrylic acid esters, acrylic acid salts (such as sodium salt, potassium salt, and ammonium salt), meth- acrylic acid salts (such as sodium salt, potassium salt, and ammonium salt), unsaturated dicarboxylic acids such as itaconic acid, maleic acid and fumaric acid; unsaturated dicarboxylic acid esters such as methyl itaconate, dimethyl itaconate, methyl maleate, methyl fumarate, dimethyl fumarate and its salt (such as sodium salt, potassium salt, and ammonium salt). Examples of monomers containing a sulfinic acid group or its salt include styrenesulfonic acid and its salt, vinylsulfonic acid and its salt (such as sodium salt, potassium salt, and ammonium salt), and acid anhydrides such as anhydrous maleic acid and anhydrous itaconic acid. Examples of bi- or more functional monomers include divinyl ether, divinylsulfon, diallyphthalate, diallylcarbinol, ethylene glycol methacrylate, dimethylene glycol diacrylate, dimethylene glycol dimethacrylate, trimethylenpropane triacrylate, trimethylolpropane trimethacrylate, and trimethylolpropane dimethacrylate.

Exemplary examples of resins usable in the sublayer include co-(styrene/glycidyl methacrylate/butyl acrylate) polymer, co-(styrene/glycidyl methacrylate)polymer, co-(styrene/glycidyl methacrylate/2-hydroxyethyl methacrylate)polymer, co-(styrene/butadiene)polymer, co-(styrene/isoprene)polymer, co-(styrene/chloroprene) polymer, co-(methyl methacrylate/butadiene)polymer, co-(acrylonitrile/butadiene)polymer, co-(butadiene/vinyl acetate/glycidyl methacrylate)polymer, co-(glycidyl methacrylate/butadiene)polymer, co-(glycidyl methacrylate/butadiene/isoprene)polymer, co-(glycidyl methacrylate/butadiene/acrylamide)polymer, co-glycidyl methacrylate/butadiene/hydroxyethyl acrylate)polymer, co-(vinylidene chloride/methyl methacrylate/acrylonitrile/glycidyl acrylate)polymer, co-(styrene/t-butyl acrylate/n-butyl acrylate/2-hydroxyethyl methacrylate)polymer, co-(styrene/glycidyl methacrylate/glycidyl acrylate/sodium styrenesulfonate/anhydrous maleic acid)polymer, co-ethyl acrylate/acetaceoxyethyl acrylamide/n-butyl acrylate/2-hydroxyethyl acrylate/acetoacetoaminopropyl methacrylamide)polymer, co-(ethyl acrylate/sodium sulfoethyl acrylamide/acetoacetoaminoethyl acrylamide) polymer, and co-(ethyl acrylate/2-hydroxyethyl methacrylate/acetoacetoaminoethyl acrylate)polymer.

Copolymers described above are contained alone or in combination in the sublayer. In cases where being contained in combination, a combination of copolymers different in Tg is preferred. Hydrophilic and hydrophobic copolymers may be combined. In cases when the sublayer contains two or more kinds of copolymers in combination, one of the copolymers exhibits the lowest glass transition temperature (denoted as TgL) and another one exhibits the highest glass transition temperature (denoted as TgH), the difference between TgL and TgH is preferably 10 to 80° C. The glass transition temperature (Tg) can be determined according to the method described in J. Brandrup et al., "Polymer Handbook", III-139 to III-179 (1969, Wirey and Sons), and in the case of copolymers, the Tg can be determined according to the following equation:

$$\text{Tg(of copolymer)}(\text{° K})=v_1 Tg_1+v_2 Tg_2+\ldots+v_n Tg_n$$

where $v_1, v_2, \ldots$ and $v_n$ each are a fraction by weight of each monomer and $Tg_1, Tg_2 \ldots$ and $Tg_n$ each are a glass transition temperature (° K) of a homopolymer obtained from each monomer. The precision of the Tg calculated from the above equation is within +5° C.

The copolymers described above can be synthesized according to commonly known methods. In solution polymerization, a monomer mixture in a solvent (conventionally, in an amount of 40% or less, and preferably 10 to 25% by weight, based on the mixture) is allowed to polymerize in the presence of an initiator at a temperature of 10 to 200° C. (preferably 30 to 120° C.) over a period of 0.5 to 48 hrs. (and preferably 2 to 20 hrs.). Any solvent capable of dissolving the monomer mixture is usable. Examples thereof include water, methanol, ethanol, dimethylsulfoxide, dimethylformamide, dioxane and their mixture. Examples of initiators include organic solvent-soluble initiators such as benzoyl peroxide, azobis-isobutylonitrile (AIBN), and di-t-butyl peroxide; water-soluble initiators such as ammonium persulfate (APS), potassium persulfate, and 2,2'-azobis-(2-aminopropane)-hydrochloride; and redox type initiators such as a combination of the initiators described above with a reducing agent such as $Fe^{2+}$ salt or sodium hydrogen sulfite.

In emulsion polymerization are used, as an initiator, organic or inorganic peroxides, acetyl peroxide, peracetic acid, hydrogen peroxide, and peroxy acid salts such percarbonate salt, persulfate salt, and perborate. Commonly used organic or inorganic reducing agents may be used in combination with an initiator to promote performance of the initiator. Various kinds of dispersing aids may be added to enhance dispersion stability of latexes during or after polymerization. The dispersing aids include, for example, polymeric protective colloids such as polyvinyl alcohol and hydroxymethyl cellulose; and anionic or nonionic surfactants such as sodium dodecybenzenesulfonate, sodium laurate, polyoxyethylene fatty acid monoester and polyoxyethylene phenyl ether. Mercaptan compounds may be optionally added as a molecular weight-controlling agent. It is preferred that polymerization conditions be varied with an addition method of each component to a polymerization system, addition concentration, and temperature, pressure or stirring conditions during polymerization reaction. Monomers may be stoichiometrically added. Alternatively, monomers may be added in excess and recovered after completing polymerization. A stabilizer, a reaction accelerator or a cross-linking agent may be optionally added before or during synthesis. After completing synthesis, a pH-adjusting agent, surfactant, dispersion stabilizer or wetting agent may be added to provide aging stability to the latex. The average size of hydrophobic polymer particles is preferably 0.005 to 2.0 μm and more preferably 0.01 to 0.8 μm.

In emulsion are used polymerization monomers of 10 to 80% by weight, based on water as a dispersing medium, a polymerization initiator of 0.05 to 5% by weight and a dispersing agent of 0.1 to 20 by weight, based on the monomers; and polymerization is carried out at a temperature of 30 to 100° C. (and preferably 60 to 90° C.) over a period of 3 to 8 hrs. with stirring. The monomer concentration, the amount of an initiator, and the reaction temperature or time can be optionally varied. The usable dispersing agent include, for example, water soluble polymers, anionic surfactants, nonionic surfactants, cationic surfactants and amphoteric surfactants.

Not only the above-described resins obtained from vinyl monomers, but also polyester resins are preferably used in the sublayer used in the invention. Polyesters obtained by condensation polymerization of glycols and dicarboxylic acids, or polyester copolymers obtained by self-condensation of oxyacids are preferably used, and hydrophilic polyesters are more preferably used. Herein, the hydrophilic polyester copolymer is a polyester copolymer dissolved or dispersed in water. The hydrophilic polyester copolymers include those described in U.S. Pat. Nos. 4,252,885, 4,241,169, and 4,394,442; European Patent 29,620 and 78,559; JP-A 54-43017; and Research Disclosure 18928. Examples thereof include a substantially linear polymer obtained by polycondensation of a polybasic acid or its ester-forming derivative, and a polyol or its ester-forming derivative. Examples of the polybasic acid include terephthalic acid, isophthalic acid, phthalic acid, anhydrous phthalic acid, 2,6-naphthalenedicarboxylic acid, 1,4-cyclohexanedicarboxylic acid, adipinic acid, sebacic acid, trimellitic acid, pyromellitic acid, and dimmer acid. The above-described polybasic acid component may be used in combination with an unsaturated polybasic acid such as maleic acid, fumaric acid or itacinic acid, or a hydroxycarboxylic acid such as p-hydroxybebzoic acid or p-(β-hydroxyethoxy)benzoic acid. Specifically, a polyestercopolymer containing terephthalic acid and isophthalic acid, as a main dicarboxylic acid, is preferred, in which the molar ratio of terephthalic acid/isophthalic acid is preferably within a range of 30/70 to 70/30 in terms of coatability on the support and solubility in water. The content of terephthalic acid and isophthalic acid components is preferably 50 to 80%, based on total dicarboxylic acids.

To provide water-solubility to polyester, it is effective to introduce, as a copolymerizing component, a component containing a hydrophilic group, such as a sulfonate-containing component, dimethylene glycol component, polyalkylene ether glycol component or polyether dicarboxylic acid component into the polyester. Specifically, as the hydrophilic group containing component is preferably used a dicarboxylic acid containing a sulfonate salt. Of sulfonate-containing dicarboxylic acids are preferred those containing an alkali metal sulfonate group. Examples thereof include alkali metal salts of 4-sulfoisophthalic acid, 5-sulfoisophthalic acid, sulfoterephthalic acid, 4-sulfophthalic acid, 4-sulfonaphthalene-2,7-dicarboxylic acid, and 5-(4-sulfophenoxy)isophthalic acid. Of these is preferred 5-sulfoisophthalic acid sodium salt. The sulfocontaining dicarboxylic acid is used preferably within a range of 5 to 15 mol %, and more preferably 6 to 10 mol %, based on total dicarboxylic acids, in terms of aqueous solubility and water resistance.

In aqueous soluble polyester containing terephthalic acid and isophthalic acid as a main dicarboxylic acid component, an aliphatic dicarboxylic acid, as a copolymerizing component is preferably contained in combination. Examples thereof include 1,4-cyclohexanedicarboxylic acid, 1,3-cyclohexanedicarboxylic acid, 1,2-cyclohexanedicarboxylic acid, 1,3-cyclopentanedicarboxylic acid and 4,4'-bicyclohexyldicarboxylic acid. Further, dicarboxylic acids other than the dicarboxylic acids described above may be contained as a copolymerizing component, such as aromatic dicarboxylic acids and straight-chained aliphatic dicarboxylic acids. The aromatic icarboxylic acid component is contained preferably in an amount of not more than 30 mol %, based on total dicarboxylic acids. Examples of aromatic dicarboxylic acids include phthalic acid, 2,5-dimethylterephthalic acid, 2,6-naphthalenedicarboxylic acid, 1,4-naphthalenedicarboxylic acid, and biphenyldicarboxylic acid. The straight-chained aliphatic dicarboxylic acid component is contained in an amount of not more than 15 mol %, based on total dicarboxylic acids. Examples thereof include adipinic acid, pimelic acid, suberic acid, azelaic acid and sebacic acid.

Examples of the polyol component include ethylene glycol, dimethylene glycol, 1,4-butanediol, neopentyl glycol, dipropylene glycol, 1,6-hexanediol, 1,4-cyclohexanediol, xylilene glycol, trimethylolpropane, poly(ethyleneoxide)glycol, and poly(tetramethyleneoxide) glycol. Examples of the glycol component of the hydrophilic polyester copolymer include ethylene glycol, 1,4-butanediol, neopentyl glycol, 1,4-cyclohexanedimethanol, dimethylene glycol, triethylene glycol, and polyethylene glycol. In cases where the hydrophilic polyester copolymer contains terephthalic acid and isophthalic acid as a main dicarboxylic acid component, it is preferred to contain, as a glycol component of aqueous soluble polyester, ethylene glycol of 50 mol % or more of total glycol components in terms of mechanical properties and adhesive property to the polyester support.

Hydrophilic polyester copolymers can be synthesized using, as a starting materials, dicarboxylic acids or their ester-forming derivatives, and glycols or their ester-forming derivatives. For example, commonly known method of preparing polyesters is conducted, in which an initial condensate of a dicarboxylic acid and a glycol is formed through ester interchange or direct esterification and melt polycondensation is further undergone. Exemplarily, a dicarboxylic acid such as dicarboxylic acid dimethyl ester and glycol undergoes ester interchange, and after distilling methanol, pressure is gradually reduced and polycondensation is undergone under high vacuum. Alternatively, a dicarboxylic acid ester and a glycol undergo ester interchange and a dicarboxylic acid is further added thereto to undergo esterification, thereafter, polycondensation is undergone under high vacuum. In this case, commonly known ester interchange catalysts and polycondensation catalysts can be employed. Examples of the ester interchange catalyst include manganese acetate, calcium acetate, and zinc acetate. Examples of the polycondensation catalyst include antimony trioxide, germanium oxide, dibutyl tin oxide, and titanium tetrabutoxide. Various conditions such as a polymerization method or catalyst are not specifically limited to those as exemplified above.

Commercially available hydrophilic polyester copolymers include, for example, FYP6762, MPS7762, WD3652, WTL6342, WNT9519, WMS5113, WD, SIZE, WNT, and WHS (which are trade names), which are available from Eastman Chemicals Corp. These are usable in the invention.

Hydrophilic polyester copolymers, which are modified with a vinyl type monomer. The expression "modified" means that a vinyl monomer is allowed to undergo dispersion polymerization in an aqueous solution of a hydrophilic polyester copolymer. For example, a hydrophilic polyester copolymer is dissolved in hot water and a vinyl monomer is dispersed in the aqueous hydrophilic polyester copolymer solution to undergo emulsion polymerization or suspension polymerization. As the vinyl monomers used for the modified hydrophilic polyester copolymer can be used the same ones as monomers of copolymers used in the sublayer described above. In modification with vinyl monomers are used polymerization initiators or a surfactanst, including those used in polymer latexes. With regard to the amount of a vinyl monomer to be used, the weight ratio of hydrophilic polyester copolymer/vinyl monomer is preferably within a range of 99/1 to 5/95, more preferably 97/3 to 50/50, and still more preferably 95/5 to 80/20.

The sublayer may be further added with a cross-linking agent (hardener9, a surfactant, a support-swelling agent, a matting agent, an antistatic agent or an aqueous soluble resin. The cross-linking agent is preferably used to enhance adhesion between the sublayer and a component layer of the photothermographic material. Examples of cross-linking agents include formaldehyde, glutar aldehyde, aldehyde compounds described in U.S. Pat. Nos. 3,291,624 and 3,232,764; French Patent 1,543,694; and British Patent 1.270,578; 2-hydroxy-4,6-dichloro-1,3,5-triazine (or its sodium salt); triazines compounds described in U.S. Pat. Nos. 3,325,287, 3,288,775 and 3,549,377; and Belgian Patent 6,602,226; epoxy compounds described in Y.S. Pat. No. 3,091,537 and JP-B 49-26580; bis(2-chloroethyl)urea, divinylsulfon, 5-acetyl-1,3-diacryloylhexahydro-1,3,5-triazine, reactive olefin compounds described in U.S. Pat. No. 3,642,486, 3,232,763 and 3,635,718, and British Patent 994,809, aziridine compounds described in U.S. Pat. No. 3,392,024, 3,549,378, 2,983,611 and 3,107,280; reactive halogen compounds described in U.S. Pat. No. 2,732,303 and 3,288,775, and British Patent 974,723 and 1,167,207; ketone compounds such as cyclopentanedione; vinylsulfon compounds described in U.S. Pat. No. 3,539,644 and 3,642,486, JP-B 49-13568, 53-47271 and 56-48860, JP-A 53-57257, 61-128240, 62-4275, 63-53541 and 63-264572; N-hydoxymethylphthalimide, N-methylol compounds described in U.S. Pat. Nos. 2,732,316 and 2,586,168; isocyanate compounds described in U.S. Pat. No. 3,103,437; acid derivatives described in U.S. Pat. Nos. 2,725,294 and 2,725,295; carbodiimide compounds described in U.S. Pat. No. 3,100,704; isooxazole compounds described in U.S. Pat. Nos. 3,321,313 and 3,543,292; halogenocarboxyaldehyde compounds such as mucochloric acid; dioxane compounds such as dihydroxydioxane and dichlorodioxane; inorganic hardeners such as chromium alumzirconium sulfate, and chromium trichloride; compounds having a dihydroxyquinoline skelton described in JP-A 50-38540; N-carbamoylpyridinium salt compounds described in JP-A 51-59625, 62-262854, 62-264044 and 63-184741; acylimidazole compounds described in JP-B 55-38655; N-acyloxyimidazole compounds described in JP-b 53-22089; N-acyloxyimino compounds described in JP-B 53-22089; N-sulfonyloxyimide compounds described in JP-a 52-93470; compounds containing a phosphorus-halogen bond described in JP-A 58-113829; and chloroform amidinium compounds described in JP-A 60-225148, 61-240236 and 63-41580.

The sublayer may be added with an aqueous soluble polymer to enhance coatability. Examples of aqueous soluble polymers include hydroxyethyl cellulose (HEC), carboxymethyl cellulose (CMC), methyl cellulose (MC), hydroxypropylmethyl cellulose (HPMC), ethylhydroxyethyl cellulose (EHEC), hydrophobicity-modified hydroxyethyl cellulose (HMHEC), xanthane, cationic hydroxyethyl cellulose (CATHEC), povinyl alcohol (PVA), polyacrylamide, sodium alginate, Carbopol (trade name) acrylamode thickner composition.

A sublayer is also useful, in which a solvent capable of swelling or dissolving a polyester support is used together with the hydrophilic resin. This sublayer can enhance adhesive property of a photographic component layer such as a silver halide emulsion layer. The resin is preferably natural or synthetic polymers containing a hydrophilic group as a side chain, such as hydroxy group, carboxy group, acid anhydride, amino group or cyclic amido group, alone or in combination; and a reaction product of epichlorohydrin and an amine compound is preferred. Examples of the solvent capable of swelling or dissolving a polyester support include resorcin, chlororesorcin, methylresorcin, o-cresol, m-cresol, p-cresol, phenol, o-chlorophenol, p-chlorophenol, dichlorophenol, trichlorophenol, monochloroacetic acid, dichloroacetic acid, trichloroacetic acid, trifluoroacetic acid, hydrated chloral. Of these are preferred resorcin and p-chlorophenol. Examples of aromatic compound containing a carboxyl group or an acid anhydride include carboxylic acids such as salicylic acid and benzoic acid and their acid anhydrides. The content of the solvent is preferably 1 to 20 parts of a subbing solution to satisfy both flatness and adhesive property of films.

In the photothermographic image forming layer or backing layer used in the invention is used a hydrophilic resin layer, preferably such as a gelatin layer, acrylamide derivative layer or their mixture layer, or a hydrophobic resin layer, preferably such as cellulose diacetate layer, cellulose triacetate layer, cellulose acetate butylate layer, cellulose acetate propionate layer, polyvinyl formal layer, polyvinyl butyral layer or polyurethane layer. Accordingly, the sublayer is preferably one capable of allowing these layers to be suitably adhered. The above-described resins used for the sublayer are usable in the invention; a sublayer formed by emulsion polymerization and a sublayer soluble with an organic solvent both exhibit superior adhesive property.

A hydrophilic resin layer may be provided on the sublayer. Examples of the hydrophilic resin include aqueous soluble polymers such as gelatin, gelatin derivatives, agar, sodium alginate, starch, polyvinyl alcohol, polyacrylic acid copolymer, carboxymethyl cellulose, or hydroxyethyl cellulose, and a combination of poly(sodium styrenesulfonate) copolymer and a hydrophobic latex. Addition of a hardener to the upper sublayer can enhance strength and adhesive property of the layer. The upper sublayer is preferably added with fine inorganic particles such as silicon dioxide or titanium dioxide, or an organic matting agent (having a particle size of 1 to 10 $\mu$m). Further thereto may be incorporated various additives such as an antistatic agent, coloring dye, pigment and coating aid. Coating of the sublayer may be conducted before stretching, after completion of longitudinal stretching or after completion of biaxial stretching.

Synthesis of copolymers used for the sublayer is exemplarily shown below.

Polymerization of P-1

To a reaction vessel provided with a stirrer, reflux condenser, a dropping funnel and a nitrogen-introducing tube was added 300 parts by weight of degassed distilled water and then nitrogen gas was introduced through the nitrogen-introducing tube to make the reaction vessel under a nitrogen gas atmosphere and remove oxygen dissolved in water. After the temperature was raised to 80° C., 50 weight parts aqueous solution containing 5 weight parts of sodium dodecylbenzenesulfonate was dropwise added using a dropping funnel, a monomer mixture of 34.6 weight parts of styrene, 68.8 weight parts of glycidyl methacrylate and 68.8 weight parts of n-butylacrylate was dropwise added using another dropping funnel, 50 weight parts aqueous solution containing 3 weight parts of ammonium persulfate was dropwise added using another dropping funnel, and the reaction mixture was reacted at 80° C. under nitrogen gas reflux for 8 hrs. to obtain aqueous soluble latex (P-1) of styrene/glycidyl methacrylate/n-butyl acrylate (20/40/40).

Polymerization of P-2

To a reaction vessel provided with a stirrer, reflux condenser, a dropping funnel and a nitrogen-introducing tube was added 300 parts by weight of degassed distilled water and then nitrogen gas was introduced through the nitrogen-introducing tube to make the reaction vessel under a nitrogen gas atmosphere and remove oxygen dissolved in water. After the temperature was raised to 80° C., 50 weight parts aqueous solution containing 5 weight parts of sodium dodecylbenzenesulfonate was dropwise added using a dropping funnel, a monomer mixture of 102.6 weight parts of styrene and 68.4 weight parts of glycidyl methacrylate was dropwise added using another dropping funnel, 50 weight parts aqueous solution containing 3 weight parts of ammonium persulfate was dropwise added using another dropping funnel, and the reaction mixture was reacted at 80° C. under nitrogen gas reflux for 8 hrs. to obtain aqueous soluble latex (P-1) of styrene/glycidyl methacrylate (60/40).

Polymerization of P-3

To a reaction vessel provided with a stirrer, reflux condenser, a dropping funnel and a nitrogen-introducing tube was added 300 parts by weight of degassed distilled water and then nitrogen gas was introduced through the nitrogen-introducing tube to make the reaction vessel under a nitrogen gas atmosphere and remove oxygen dissolved in water. After the temperature was raised to 80° C., 50 weight parts aqueous solution containing 5 weight parts of sodium dodecylbenzenesulfonate was dropwise added using a dropping funnel, a monomer mixture of 42.8 weight parts of styrene, 51.3 weight parts of 2-hydroxyethyl acrylate and 77.0 weight parts of n-butylacrylate was dropwise added using another dropping funnel, 50 weight parts aqueous solution containing 3 weight parts of ammonium persulfate was dropwsie added using another dropping funnel, and the reaction mixture was reacted at 80° C. under nitrogen gas reflux for 8 hrs. to obtain aqueous soluble latex (P-1) of styrene/2-hydroxyethyl methacrylate/n-butyl acrylate (25/30/45).

Polymerization of P-4

Water of 760 ml was added to an autoclave, stirred at atmospheric pressure with supplying dried nitrogen gas and then degassed. Subsequently, the autoclave was entirely cooled to −20° C., and was added 40 ml of an aqueous 5 wt % sodium dodecylbenzenesulfonate solution, 0.5 g of sodium hydrogen sulfite and 0.5 g of ammonium persulfate. Further, 40 g of butadiene, 20 g of vinyl acetate and 40 g of glycidyl methacrylate were added and sealed. Subsequently, the reaction mixture was heated to 60° C. with stirring and allowed to stand at 60° C. After the pressure reached 0, reaction was continued for 1 hr. and then cooled. The reaction time was 5 hrs. The thus obtained copolymer was aqueous dispersion latex (P-4) of butadiene/vinyl acetate/glycidyl methacrylate (40/20/40), in the form of fine particles dispersed in hydrophilic medium.

Polymerization of P-5

Onto 1 lit. four-necked flask were mounted a stirrer, a thermometer, a dropping funnel, nitrogen gas-introducing tube and a reflux condenser, and 1.0 g of sodium dodecylbenzenesulfonate and 350 ml water were added thereto and heated until reaching an internal temperature of 80° C., while introducing nitrogen gas. After reaching 80° C., nitrogen gas was further introduced for 30 min. Then, polymerization initiator, 0.45 g of ammonium persulfate dissolved in 10 ml water was added thereto, thereafter, 40 g of ethyl acrylate, a mixture of 30 g of N-(2-acetoacetoxyethyl)acrylamide and 30 g of n-butyl methacrylate, as polymerizing unsaturated compounds, was added in 1 hr. using the dropping funnel. The reaction mixture solution was cooled at 5 hrs. after adding the initiator and filtered after adjusting the pH with aqueous ammonia to remove coarse particles. Active methylene-containing copolymer latex P-5 was thus obtained.

Polymerization of P-6

Onto 500 ml four-necked flask were mounted a stirrer, a thermometer, a dropping funnel, nitrogen gas-introducing tube and a reflux condenser, and 200 ml dioxane was added thereto and heated until reaching an internal temperature of 70° C., while introducing nitrogen gas. After reaching 70° C., nitrogen gas was further introduced for 30 min. Stopping supply of nitrogen gas, 40 g of butyl acrylate, 15 g of 2-hydroxyethyl acrylate and 45 g of N-(3- acetoacetoamidopropyl)methacrylate were each added, 0.3 g of azobisisobutylonitrile dissolved in 10 ml dioxane was further added thereto and polymerization was undergone at 700 c for 12 hrs. The obtained polymer was poured into 2 lit mixture solution of water and methanol (50/50) and was precipitated. After being filtered and dried, white powdery copolymer P-6 of 100 g was obtained.

Polymerization of P-7

Onto 500 ml four-necked flask were mounted a stirrer, a thermometer, a dropping funnel, nitrogen gas-introducing tube and a reflux condenser, and 200 ml dioxane was added thereto and heated until reaching an internal temperature of 70° C., while introducing nitrogen gas. After reaching 70° C., nitrogen gas was further introduced for 30 min. Stopping supply of nitrogen gas, 40 g of butyl acrylate, 20 g of glycidyl methacrylate and 20 g of styrene were each added, 0.3 g of azobisisobutylonitrile dissolved in 10 ml dioxane was further added thereto and polymerization was undergone at 700° C. for 6 hrs. The obtained polymer was precipitated in 2 lit. of cooled ethanol and after being filtered and dried, copolymer P-7 of 95 g was obtained.

Synthesis of Modified Hydrophilic Polyester Copolymer (B)

Dimethyl terephthalate of 34.02 weight parts, 25.52 weight parts of dimethyl isophthalate, 12.97 weight parts of dimethyl 5-sulfoisophthalate sodium salt, 47.85 weight parts of ethylene glycol, 18.95 weight parts of 1,4-cyclohexanedimethanol, 0.065 weight parts of calcium acetate monohydrate and 0.22 weight parts of manganese acetate tetrahydrate were subjected to ester interchange at a temperature of 170 to 220° C. under nitrogen gas stream with distilling methanol. Thereafter, 0.04 weight parts of trimethylphosphate, 0.04 weight parts of antimony trioxide and 15.08 weight parts of 1,4-cyclohexanedicarboxylic acid were added and water close to a calculated value was distilled at a reaction temperature of 220 to 235° C. to undergo esterification. The pressure of the reaction vessel was reduced in 1 hr. and the temperature was raised to undergo polycondensation at 280° C. and not more than 1 mm Hg for 1 hr. Prepared copolymer was dispersed in water at 95° C. in 17 hrs. to obtain hydrophilic polyester copolymer A (12% solid).

Synthesis of Modified Hydrophilic Polyester Copolymer (B)

To 3,300 g of the hydrophilic polyester copolymer dispersion (A) were added 20 g of styrene, 40 g of butyl methacrylate, 40 g of glycidyl methacrylate and 1.0 g of ammonium persulfate and reacted at 80° C. for 5 hrs. After completing reaction, the reaction mixture was cooled to room temperature and modified polyester copolymer B (15% solid) was obtained.

The infrared absorbing compound used in the invention is contained in at least one of upper and lower layers of the sublayer. When the infrared absorbing compound used in the invention (specifically, dyes) are incorporated into the sublayer, the compound may be dissolved or dispersed in water or organic solvents, including, for example, alcohols (e.g., methanol, ethanol, propanol, butanol, cyclohexanol), ketones (e.g., acetone, methylethyl ketone, Cyclohexanone, acetic acid esters (methyl acetate, ethyl acetate, isopropyl acetate, amyl acetate), halogen containing solvents (methylenechloride, chloroform), aromatic hydrocarbons (toluene, xylene), ethers (dioxane, ethylene glycol monomethyl ether, anisole), dimethylformamide, dimethylsulfoxide.

The photothermographic materials relating to the invention may be provided with an antistatic layer. Fine metal oxide particles used in the invention exhibit conductivity and are usable as an antistatic agent. The antistatic layer is usually provided on the side opposite to emulsion layer of the photothermographic material. When the conductive fine metal oxide particles are contained in the antistatic layer, the antistatic layer exhibits infrared absorptivity and absorbs infrared rays irradiated from or reached the back-side to enhance sharpness. The conductive fine particles exhibit superior heat resistance and can maintain it even after thermal development, exhibiting antistatic effects at any time during usage. The volume resistivity of the conductive fine particles is preferably $10^{-5}$ to $10^9$ Ω·cm, and more preferably $10^{-1}$ to $10^8$ Ω·cm. Electric resistance of the antistatic layer can be controlled to the range of $10^1$ to $10^{10}$ Ω by adjusting the volume content of the conductive fine particles and the thickness of the antistatic layer. The more the volume content of the conductive fine particles, the higher conductivity. However, the layer strength tends to be weakened. The volume content of the fine particles is preferably 20 to 80%, and more preferably 25 to 60%, based on binder of the layer. The coating amount of the fine particles is preferably 0.05 to 5.0 g/m$^2$, and more preferably 0.1 to 2.0 g/m$^2$.

Binder used in the antistatic layer include, for example, proteins such as gelatin, gelatin derivatives, colloidal albumin, and casein; cellulose compounds such as carboxymethyl cellulose, hydroxyethyl cellulose, diacetyl cellulose and triacetyl cellulose; sugar derivatives such as agar, sodium alginate and starch; synthetic hydrophilic colloids such as polyvinyl alcohol, poly-N-vinyl pyrrolidine, polyacrylic acid copolymer, polyacrylamide and its derivatives or its partial-hydrolyzed products, polyvinyl acetate, polyacrylonitrile, polyacrylic acid ester and their copolymers; and natural products such as rosin and shellac, including their derivatives. Emulsions of styrene-butadiene copolymer, polyacrylic acid, plyacrylic acid ester and its derivativespolyvinyl acetate, vinyl acetate-acrylic acid ester copolymer, polyolefins, olefin-vinyl acetate copolymer are usable as a binder. Further, carbonate resins, polyester resins, urethane resins, epoxy resins, polyvinyl chloride, polyvinylidene chloride, and organic semiconductors such as polypyrrol are also usable as a binder. These are use alone or in combination. A compound swelling polyester film is allowed to contained in the antistatic layer to improve adhesion between the antistatic layer and polyester film. Examples of such a compound include compounds cited in the antistatic layer. The compound swelling polyester film is contained preferably in an amount of 0.01 to 5.0 g/m$^2$, and more preferably 0.05 to 1.0 g/m$^2$. In coating the antistatic layer, solvents are suitably selected, and commonly known coating aids such as saponin or dodecylbenzenesulfonates, coloring agents, UV absorbents, or heat ray-shielding agents are suitably added to the coating solution. Further, to enhance adhesion between the antistatic layer and polyester film, a sublayer may be provided therebetween.

Next, silver halide photothermographic materials relating to the invention will be described. One feature of the silver halide photothermographic material relating to the invention is that the photothermographic material is thermally developed at a temperature of 80 to 150° C. to form images and is not further subjected to fixing. Therefore, silver halide and a silver salt in unexposed areas remain in the photothermographic image forming layer and unless heated, no increase of the fog density takes place. The transmittance of the thermally developed photothermographic material is preferably not more than 0.2, and more preferably 0.02 to 0.2 in terms of transmission density.

Silver halide grains contained in the photothermographic image forming layer function as a light sensor. In order to minimize cloudiness after image formation and to obtain excellent image quality, the less the average grain size, the more preferred, and the average grain size is preferably less than 0.1 µm, more preferably between 0.01 and 0.1 µm, and still more preferably between 0.02 and 0.08 µm. The average grain size as described herein is defined as an average edge length of silver halide grains, in cases where they are so-called regular crystals in the form of cube or octahedron. Furthermore, in cases where grains are not regular crystals, for example, spherical, cylindrical, and tabular grains, the grain size refers to the diameter of a sphere having the same volume as the silver grain. Furthermore, silver halide grains are preferably monodisperse grains. The monodisperse grains as described herein refer to grains having a monodispersibility obtained by the formula described below of less than 30%, and more preferably from 0.1 to 20%.

Monodispersibility=(standard deviation of grain diameter)/(average grain diameter)×100(%)

The silver halide grain shape is not specifically limited, but a high ratio accounted for by a Miller index [100] plane is preferred. This ratio is preferably at least 50%; is more preferably at least 70%, and is most preferably at least 80%. The ratio accounted for by the Miller index [100] face can be obtained based on T. Tani, J. Imaging Sci., 29, 165 (1985) in which adsorption dependency of a [111] face or a [100] face is utilized. Furthermore, another preferred silver halide shape is a tabular grain. The tabular grain as described herein is a grain having an aspect ratio (AR), as defined below, of at least 3:

AR=average grain diameter (µm)/grain thickness (µm)

Of these, the aspect ratio is preferably between 3 and 50. The grain diameter is preferably not more than 0.1 µm, and is more preferably between 0.01 and 0.08 µm. These are described in U.S. Pat. Nos. 5,264,337, 5,314,789, 5,320,958, and others. In the present invention, when these tabular grains are used, image sharpness is further improved. The composition of silver halide may be any of silver chloride, silver chlorobromide, silver iodochlorobromide, silver bromide, silver iodobromide, or silver iodide.

The halide composition of silver halide grains is not specifically limited and may be any one of silver chloride, silver chlorobromide, silver iodochlorobromide, silver bromide, silver iodobromide and silver iodide. Silver halide emulsions used in the invention can be prepared according to the methods described in P. Glafkides, Chimie Physique Photographique (published by Paul Montel Corp., 19679; G. F. Duffin, Photographic Emulsion Chemistry (published by Focal Press, 1966); V. L. Zelikman et al., Making and Coating of Photographic Emulsion (published by Focal Press, 1964). Any one of acidic precipitation, neutral precipitation and ammoniacal precipitation is applicable and the reaction mode of aqueous soluble silver salt and halide salt includes single jet addition, double jet addition and a combination thereof. Silver halide may be incorporated into the image forming layer by any means so that the silver halide is arranged so as to be close to reducible silver source. The silver halide may be formed by reaction of an organic silver salt and a halide ion to convert a part of the organic silver salt to silver halide. Alternatively, silver halide which has been prepared in advance may be added to a solution to prepare an organic silver salt. A combination of these may be applicable bur the latter is preferred. The content of silver halide is preferably 0.75 to 30% by weight, based on an organic silver salt.

Silver halide preferably occludes ions of metals belonging to Groups 6 to 11 of the Periodic Table. Preferred as the metals are W; Fe, Co, Ni, Cu, Ru, Rh, Pd, Re, Os, Ir, Pt and Au.

These metals may be introduced into silver halide in the form of a complex. In the present invention, regarding the transition metal complexes, six-coordinate complexes represented by the general formula described below are preferred:

$(ML_6)^m$: Formula:

wherein M represents a transition metal selected from elements in Groups 6 to 11 of the Periodic Table; L represents a coordinating ligand; and m represents 0, 1-, 2-, 3- or 4-. Exemplary examples of the ligand represented by L include halides (fluoride, chloride, bromide, and iodide), cyanide, cyanato, thiocyanato, selenocyanato, tellurocyanato, azido and aquo, nitrosyl, thionitrosyl, etc., of which aquo, nitrosyl and thionitrosyl are preferred. When the aquo ligand is present, one or two ligands are preferably coordinated. L may be the same or different.

The particularly preferred example of M is rhodium (Rh), ruthenium (Ru), rhenium (Re), iridium (Ir) or osmium (Os).

Exemplary examples of transition metal ligand complexes are shown below.

1: $[RhCl_6]^{3-}$
2: $[RuCl_6]^{3-}$
3: $[ReCL_6]^{3-}$
4: $[RuBr_6]^{3-}$
5: $[OsCl_6]^{3-}$
6: $[IrCl_6]^{4-}$
7: $[Ru(NO)Cl_5]^{2-}$
8: $[RuBr_4(H_2O)]^{2-}$
9: $[Ru(NO)(H_2O)Cl_4]^-$
10: $[RhCl_5(H_2O)]^{2-}$
11: $[Re(NO)Cl_5]^{2-}$
12: $[Re(NO)CN_5]^{2-}$
13: $[Re(NO)ClCN_4]^{2-}$
14: $[Rh(NO)_2Cl_4]^-$
15: $[Rh(NO)(H_2O)Cl_4]^-$
16: $[Ru(NO)CN_5]^{2-}$
17: $[Fe(CN)_6]^{3-}$
18: $[Rh(NS)Cl_5]^{2-}$
19: $[Os(NO)Cl_5]^{2-}$
20: $[Cr(NO)Cl_5]^{2-}$
21: $[Re(NO)Cl_5]^-$
22: $[Os(NS)Cl_4(TeCN)]^{2-}$
23: $[Ru(NS)Cl_5]^{2-}$
24: $[Re(NS)Cl_4(SeCN)]^{2-}$
25: $[Os(NS)Cl(SCN)_4]^{2-}$
26: $[Ir(NO)Cl_5]^{2-}$
27: $[Ir(NS)Cl_5]^{2-}$

One type of these metal ions or complex ions may be employed and the same type of metals or the different type of metals may be employed in combinations of two or more types. Generally, the content of these metal ions or complex ions is suitably between $1\times10^{-9}$ and $1\times10^{-2}$ mole per mole of silver halide, and is preferably between $1\times10^{-8}$ and $1\times11^{-4}$ mole.

Compounds, which provide these metal ions or complex ions, are preferably incorporated into silver halide grains through addition during the silver halide grain formation. These may be added during any preparation stage of the silver halide grains, that is, before or after nuclei formation, growth, physical ripening, and chemical ripening. However, these are preferably added at the stage of nuclei formation, growth, and physical ripening; furthermore, are preferably added at the stage of nuclei formation and growth; and are most preferably added at the stage of nuclei formation.

These compounds may be added several times by dividing the added amount. Uniform content in the interior of a silver halide grain can be carried out. As disclosed in JP-A No. 63-29603, 2-306236, 3-167545, 4-76534, 6-110146, 5-273683, the metal can be distributedly occluded in the interior of the grain.

These metal compounds can be dissolved in water or a suitable organic solvent (for example, alcohols, ethers, glycols, ketones, esters, amides, etc.) and then added. Furthermore, there are methods in which, for example, an aqueous metal compound powder solution or an aqueous solution in which a metal compound is dissolved along with NaCl and KCl is added to a water-soluble silver salt solution during grain formation or to a water-soluble halide solution; when a silver salt solution and a halide solution are simultaneously added, a metal compound is added as a third solution to form silver halide grains, while simultaneously mixing three solutions; during grain formation, an aqueous solution comprising the necessary amount of a metal compound is placed in a reaction vessel; or during silver halide preparation, dissolution is carried out by the addition of other silver halide grains previously doped with metal ions or complex ions. Specifically, the preferred method is one in which an aqueous metal compound powder solution or an aqueous solution in which a metal compound is dissolved along with NaCl and KCl is added to a water-soluble halide solution. When the addition is carried out onto grain surfaces, an aqueous solution comprising the necessary amount of a metal compound can be placed in a reaction vessel immediately after grain formation, or during physical ripening or at the completion thereof or during chemical ripening.

In general, formed silver halide grains are subjected to desalting to remove soluble salts by a noodle washing method or flocculation method; however, silver halide grains used in the invention may be or may be not subjected to desalting.

Silver halide grains used in the photothermographic materials relating to the invention are preferably be subjected to chemical sensitization. As is commonly known in the art, the chemical sensitization includes, for example, sulfur sensitization, selenium sensitization, tellurium sensitization. There are also applicable in the invention noble metal sensitization with gold compounds or platinum, palladium or iridium compounds, or reduction sensitization. Compounds commonly known in sulfur sensitization, selenium sensitization or tellurium sensitization are suitably used, as described in JP-A 7-128768. Examples of tellurium sensitizers include diacyltellurides, bis(oxycarbonyl)tellurides, bis(carbamoyl)tellurides, diacyltellurides, bis(oxycarbonylditellurides, bis(carbamoyl)ditellurides, compounds containing a P=Te bond, tellurocarboxylic acid salts, Te-organyltellurocarboxylic acid esters, di(poly) tellurides, tellurides, tellurols, telluroacetals, tellurosufonates, compounds containing a P—Te bond, Te-containing heterocyclic compounds, tellurocarbonyl compounds, inorganic tellurium compounds and colloidal tellurium. Preferred compounds used in noble metal sensitization include, for example, chloroauric acid, potassium chloroaurate, potassium aurothiocyanate, gold sulfide, gold selenide, and compounds described in U.S. Pat. No. 2,448, 060 and British Patent 618,061. Examples of compound used in reduction sensitization include stannous chloride, aminoiminomethanesulfinic acid, hydrazine derivatives, borane compounds, silane compounds and polyamines.

Reduction sensitization can be conducted by ripening an emulsion with maintaining the emulsion at a pH of not less than 7 or a pAg of not more than 8.3. Further, single addition of silver ions may be introduced during grain formation to undergo reduction sensitization.

Organic silver salts used in the invention are reducible silver source, and silver salts of organic acids or organic heteroacids are preferred and silver salts of long chain fatty acid (preferably having 10 to 30 carbon atom and more preferably 15 to 25 carbon-atoms) or nitrogen containing heterocyclic compounds are more preferred. Specifically, organic or inorganic complexes, ligand of which have a total stability constant to a silver ion of 4.0 to 10.0 are preferred. Exemplary preferred complex salts are described in RD17029 and RD29963, including organic acid salts (for example, salts of gallic acid, oxalic acid, behenic acid, stearic acid, palmitic acid, lauric acid, etc.); carboxyalkylthiourea salts (for example, 1-(3-carboxypropyl)thiourea, 1-(3-caroxypropyl)-3,3-dimethylthiourea, etc.); silver complexes of polymer reaction products of aldehyde with hydroxy-substituted aromatic carboxylic acid (for example, aldehydes (formaldehyde, acetaldehyde, butylaldehyde, etc.), hydroxy-substituted acids (for example, salicylic acid, benzoic acid, 3,5-dihydroxybenzoic acid, 5,5-thiodisalicylic acid, silver salts or complexes of thiones (for example, 3-(2-carboxyethyl)-4-hydroxymethyl-4-(thiazoline-2-thione and 3-carboxymethyl-4-thiazoline-2-thione), complexes of silver with nitrogen acid selected from imidazole, pyrazole, urazole, 1,2,4-thiazole, and 1H-tetrazole, 3-amino-5-benzylthio-1,2,4-triazole and benztriazole or salts thereof; silver salts of saccharin, 5-chlorosalicylaldoxime, etc.; and silver salts of mercaptides. Of these organic silver salts, silver salts of fatty acids are preferred, and silver salts of behenic acid, arachidinic acid and stearic acid are specifically preferred.

The organic silver salt compound can be obtained by mixing an aqueous-soluble silver compound with a compound capable of forming a complex. Normal precipitation, reverse precipitation, double jet precipitation and controlled double jet precipitation described in JP-A 9-127643 are preferably employed. For example, to an organic acid is added an alkali metal hydroxide (e.g., sodium hydroxide, potassium hydroxide, etc.) to form an alkali metal salt soap of the organic acid (e.g., sodium behenate, sodium arachidinate, etc.), thereafter, the soap and silver nitrate are mixed by the controlled double jet method to form organic silver salt crystals. In this case, silver halide grains may be concurrently present.

In the present invention, organic silver salts have an average grain diameter of 1 $\mu$m or less and are monodisperse. The average diameter of the organic silver salt as described herein is, when the grain of the organic salt is, for example, a spherical, cylindrical, or tabular grain, a diameter of the sphere having the same volume as each of these grains. The average grain diameter is preferably between 0.01 and 0.8 $\mu$m, and more preferably between 0.05 and 0.5 $\mu$m. Furthermore, the monodisperse as described herein is the same as silver halide grains and preferred monodispersibility is between 1 and 30%. It is also preferred that at least 60% of the total of the organic silver salt is accounted for by tabular grains. The tabular grains refer to grains having a ratio of an average grain diameter to grain thickness, i.e., aspect ratio of 3 or more. To obtain such tabular organic silver salts, organic silver salt crystals are pulverized together with a binder or surfactant, using a ball mill. Thus, using these tabular grains, photosensitive materials exhibiting high density and superior image fastness are obtained.

To prevent hazing of the photothermographic material, the total amount of silver halide and organic silver salt is preferably 0.5 to 2.2 g in equivalent converted to silver per m², thereby leading to high contrast images. The amount of silver halide is preferably not more than 50%, more preferably not more than 25%, and still more preferably 0.1 to 15% by weight, based on total silver content.

Reducing agents are preferably incorporated into the thermally developable photothermographic material of the present invention. Examples of suitable reducing agents are described in U.S. Pat. Nos. 3,770,448, 3,773,512, and 3,593,863, and Research Disclosure Items 17029 and 29963, and include the following: aminohydroxycycloalkenone compounds (for example, 2-hydroxypiperidino-2-cyclohexane); esters of amino reductones as the precursor of reducing agents (for example, piperidinohexose reducton monoacetate); N-hydroxyurea derivatives (for example, N-p-methylphenyl-N-hydroxyurea); hydrazones of aldehydes or ketones (for example, anthracenealdehyde phenylhydrazone; phosphamidophenols; phosphamidoanilines; polyhydroxybenzenes (for example, hydroquinone, t-butylhydroquinone, isopropylhydroquinone, and (2,5-dihydroxy-phenyl)methylsulfone); sulfydroxamic acids (for example, benzenesulfhydroxamic acid); sulfonamidoanilines (for example, 4-(N-methanesulfonamide)aniline); 2-tetrazolylthiohydroquinones (for example, 2-methyl-5-(1-phenyl-5-tetrazolylthio)hydroquinone); tetrahydroquionoxalines (for example, 1,2,3,4-tetrahydroquinoxaline); amidoxines; azines (for example, combinations of aliphatic carboxylic acid arylhydrazides with ascorbic acid); combinations of polyhydroxybenzenes and hydroxylamines, reductones and/or hydrazine; hydroxamic acids; combinations of azines with sulfonamidophenols; α-cyanophenylacetic acid derivatives; combinations of bis-β-naphthol with 1,3-dihydroxybenzene derivatives; 5-pyrazolones, sulfonamidophenol reducing agents, 2-phenylindane-1,3-dione, etc.; chroman; 1,4-dihydropyridines (for example, 2,6-dimethoxy-3,5-dicarboethoxy-1,4-dihydropyridine); bisphenols (for example, bis(2-hydroxy-3-t-butyl-5-methylphenyl)methane, bis(6-hydroxy-m-tri)mesitol, 2,2-bis(4-hydroxy-3-methylphenyl)propane, 4,5-ethylidene-bis(2-t-butyl-6-methyl)phenol, UV-sensitive ascorbic acid derivatives and 3-pyrazolidones. Of these, particularly preferred reducing agents are hindered phenols. As hindered phenols, listed are compounds represented by the general formula (A) described below:

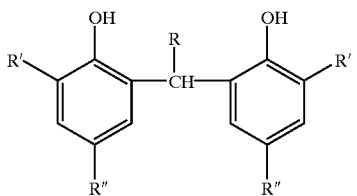

Formula (A)

wherein R represents a hydrogen atom or an alkyl group having from 1 to 10 carbon atoms (for example, —C₄H₉, 2,4,4-trimethylpentyl), and R' and R" each represents an alkyl group having from 1 to 5 carbon atoms (for example, methyl, ethyl, t-butyl).

Exemplary examples of the compounds represented by the formula (A) are shown below.

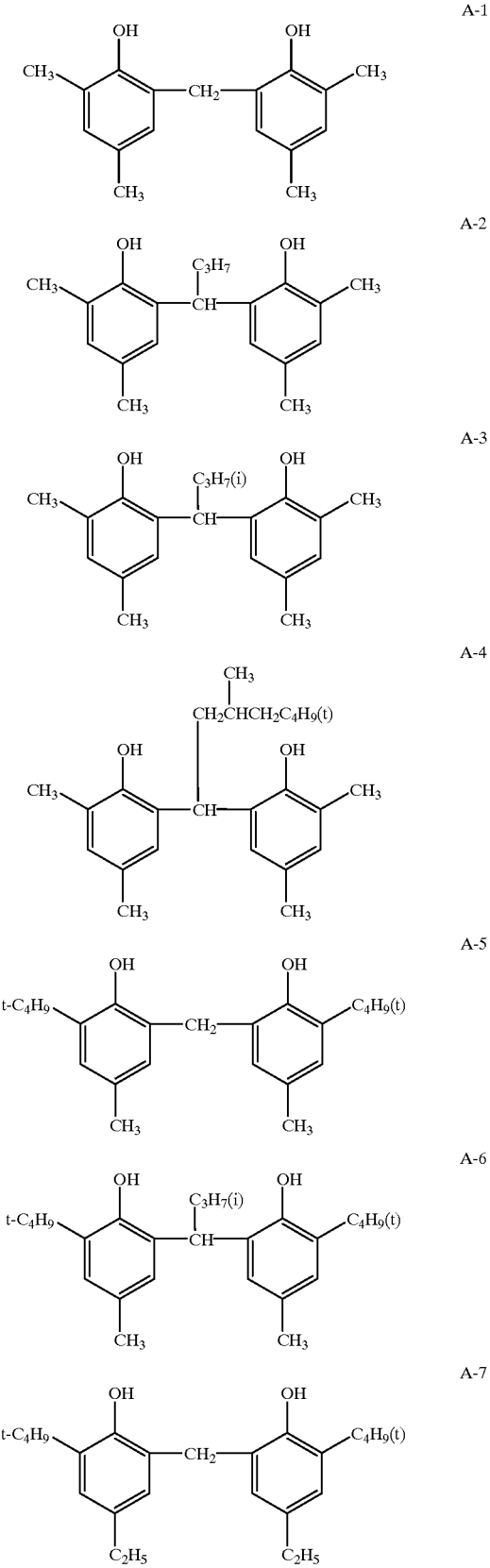

The used amount of reducing agents represented by the above-mentioned general formula (A) is preferably between $1 \times 10^{-2}$ and 10 moles, and is more preferably between $1 \times 10^{-2}$ and 1.5 moles per mole of silver.

Polymers contained in the polymeric silver salts preferably play a role of a binder used in the thermally developable materials, but the following materials may be incorporated as a binder. Binders suitable for the thermally developable photosensitive material to which the present invention is applied are transparent or translucent, and generally colorless. Binders are natural polymers, synthetic resins, and polymers and copolymers, other film forming media; for example, gelatin, gum arabic, poly(vinyl alcohol), hydroxyethyl cellulose, cellulose acetate, cellulose acetatebutylate, poly(vinylpyrrolidone), casein, starch, poly(acrylic acid), poly(methylmethacrylic acid), poly(vinyl chloride), poly(methacrylic acid), co(styrene-maleic acid anhydride) polymer, co(styrene-acrylonitrile)polymer, co(styrene-butadiene)polymer, poly(vinyl acetal) series (for example, poly(vinyl formal)and poly(vinyl butyral), poly(ester) series, poly(urethane) series, phenoxy resins, poly(vinylidene chloride), poly(epoxide) series, poly(carbonate) series, poly(vinyl acetate) series, cellulose esters, poly(amide) series. A non-photosensitive layer may be provided on the outer side of the photothermographic image forming layer to protect the surface of photothermographic materials or prevent the surface from abrasion marks. Binder used in the non-photosensitive layer may be the same or different from that used in the photosensitive layer. These may be hydrophilic or hydrophobic. In the present invention, the amount of the binder in a photosensitive layer is preferably between 1.5 and 6 g/m$^2$, and is more preferably between 1.7 and 5 g/m$^2$. Suitable contents of image forming materials can maintain the image density.

In the present invention, a matting agent is preferably incorporated into the image forming layer side. In order to minimize the image abrasion after thermal development, the matting agent is provided on the surface of the photothermographic image forming layer and the matting agent is preferably incorporated in an amount of 0.5 to 30 per cent in weight ratio with respect to the total binder in the emulsion layer side. Materials of the matting agents employed in the present invention may be either organic substances or inorganic substances. Regarding inorganic substances, for example, those can be employed as matting agents, which are silica described in Swiss Patent No. 330,158, etc.; glass powder described in French Patent No. 1,296,995, etc.; and carbonates of alkali earth metals or cadmium, zinc, etc. described in U.K. Patent No. 1.173,181, etc. Regarding organic substances, as organic matting agents those can be employed which are starch described in U.S. Pat. No. 2,322,037, etc.; starch derivatives described in Belgian Patent No. 625,451, U.K. Patent No. 981,198, etc.; polyvinyl alcohols described in Japanese Patent Publication No. 44-3643, etc.; polystyrenes or polymethacrylates described in Swiss Patent No. 330,158, etc.; polyacrylonitriles described in U.S. Pat. No. 3,079,257, etc.; and polycarbonates described in U.S. Pat. No. 3,022,169. The shape of the matting agent may be crystalline or amorphous. However, a crystalline and spherical shape is preferably employed. The size of a matting agent is expressed in the diameter of a sphere which has the same volume as the matting agent. The particle diameter of the matting agent in the present invention is referred to the diameter of a spherical converted volume. The matting agent employed in the present invention preferably has an average particle diameter of 0.5 to 10 µm, and more preferably of 1.0 to 8.0 µm.

The silver halide photothermographic material used in the invention is subjected to thermal development to form photographic images, preferably comprising reducible silver source (organic silver salts), silver halide in an amount necessary to exhibit catalytic activity, a hydrazine derivative and a reducing agent, and, optionally, a toning agent restraining silver image tone, which are dispersed in (organic) binder matrix. The silver halide photothermographic materials are stable at ordinary temperatures, and are developed on heating, after exposure, at a high temperature (e.g., 80 to 140° C.), forming silver on heating through oxidation-reduction reaction between an organic silver salt (which functions as an oxidizing agent) and a reducing agent. The oxidation-reduction reaction is catalytically accelerated by silver formed upon exposure to light. Silver produced from the reaction of the organic silver salt in an exposed area gives a black image distinguishable from an unexposed area to perform image formation. This reaction process can proceed without supplying a processing solution such as water from the outside.

The silver halide photothermographic materials relating to the invention have at least an image forming layer on the support. There may be provided the image forming layer alone, but further thereon, at least a light-insensitive layer is preferably provided. To control the amount or wavelength distribution of light transmitting through the image forming layer, a filter layer may be provided on the same side or opposite side to the image forming layer. Further, the image forming layer may contain a dye or pigment. There are usable compounds described in JP-A 59-6481 and 59-182436; U.S. Pat. Nos. 4,271,263, and 4,594,312; European Patent 533,008 and 652,473; and JP-A 2-216140, 4-348339, 7-191432 and 7-301890.

Further, the non-photosensitive layer is preferably added with the binder or matting agent described above, and may be added with a lubricant such as polysiloxane compounds, wax, or liquid paraffin. The photothermographic image forming layer may be comprised of plural layers, or high-speed and low-speed layers to adjust gradation.

Image toning agents are preferably incorporated into the thermally developable photosensitive material used in the present invention. Examples of preferred image toning agents are disclosed in Research Disclosure Item 17029, and include the following:

imides (for example, phthalimide), cyclic imides, pyrazoline-5-one, and quinazolinone (for example, succinimide, 3-phenyl-2-pyrazoline-5-on, 1-phenylurazole, quinazoline and 2,4-thiazolidione); naphthalimides (for example, N-hydroxy-1,8-naphthalimide); cobalt complexes (for example, cobalt hexaminetrifluoroacetate), mercaptans (for example, 3-mercapto-1,2,4-triazole); N-(aminomethyl) aryldicarboxyimides (for example, N-(dimethylaminomethyl)phthalimide); blocked pyrazoles, isothiuronium derivatives and combinations of certain types of light-bleaching agents (for example, combination of N,N'-hexamethylene(1-carbamoyl-3,5-dimethylpyrazole), 1,8-(3,6-dioxaoctane)bis-(isothiuroniumtrifluoroacetate), and 2-(tribromomethyl-sulfonyl)benzothiazole; merocyanine dyes (for example, 3-ethyl-5-((3-etyl-2-benzothiazolinylidene-(benzothiazolinylidene))-1-methylethylidene-2-thio-2,4-oxazolidinedione); phthalazinone, phthalazinone derivatives or metal salts thereof (for example, 4-(1-naphthyl)phthalazinone, 6-chlorophthalazinone, 5,7-dimethylphthalazinone, and 2,3-dihydro-1,4-phthalazinedione); combinations of phthalazinone and sulfinic acid derivatives (for example, 6-chlorophthalazinone and benzenesulfinic acid sodium, or 8-methylphthalazinone and p-trisulfonic acid sodium); combinations of phthalazine and phthalic acid; combinations of phthalazine (including phthalazine addition products) with at least one compound selected from maleic acid anhydride, and phthalic acid, 2,3-naphthalenedicarboxylic acid or o-phenylenic acid derivatives and anhydrides thereof (for example, phthalic acid, 4-methylphthalic acid, 4-nitrophthalic acid, and tetrachlorophthalic acid anhydride); quinazolinediones, benzoxazine, naphthoxazine derivatives, benzoxazine- 2,4-diones (for example, 1,3-benzoxazine-2,4-dione); pyrimidines and asymmetry-triazines (for example, 2,4-dihydroxypyrimidine), and tetraazapentalene derivatives (for example, 3,6-dimercapto-1,4-diphenyl-1H, 4H-2,3a,5,6a-tatraazapentalene). Preferred image color control agents include phthalazone or phthalazine.

To the photothermographic image forming layer, mercapto compounds, disulfide compounds and thione compounds may be incorporated to retard or promote thermal development, enhance spectral sensitization efficiency or improve image lasting quality. Specifically, meracapto compounds represented by general formulas Ar—SM1 and Ar—S—S—Ar, in which M1 is a hydrogen atom or an alkali metal atom; and Ar is an aromatic ring or a condensed aromatic ring containing at least one of nitrogen, sulfur, oxygen, selenium and tellurium. Such preferred heterocyclic rings include benzimidazole, naphthoimidazole, benzothiazole, naphthothiazole, benzoxazole, naphthooxazole, benzoselenazole, benzotellurazole, imidazole, oxazole, pyrazole, triazole, thiadiazole, tetrazole, triazines, pyrimidine, pyridazine, pyrazine, pyridine, purine quinoline and quinazoline. The heterocyclic rings may contain a substituent selected from a halogen atom (e.g., Br, Cl), hydroxy, amino group, carboxyl group, alkyl (for example, having 1 to 4 carbon atoms) and alkoxy (for example, having 1 to 4 carbon atoms). Examples of such mercapto-substituted heterocyclic compounds include 2-mercaptobenzimidazole, 2-mercaptobenzoxazole, 2-mercaptobenzthiazole, 2-mercapto-5-methylbenzthiazole, 3-mercapto-1,2,4-triazole, 2-mercaptoquinoline, 8-mercaptopurine, 2,3,5,6-tetrachloro-4-pyridinethiol, 4-hydroxy-2-mercaptopyrimidine, and 2-mercapto-4-phenyloxazole. The compounds usable in the invention are not limited to these compounds.

Antifoggants may be incorporated into the thermally developable photosensitive material to which the present invention is applied, as disclosed in U.S. Pat. Nos. 4,546,075 and 4,452,885, and Japanese Patent Publication Open to Public Inspection No. 59-57234. Particularly preferred mercury-free antifoggants are heterocyclic compounds having at least one substituent, represented by —C(X1)(X2)(X3) (wherein X1 and X2 each represent halogen, and X3 represents hydrogen or halogen), as disclosed in U.S. Pat. Nos. 3,874,946 and 4,756,999. As examples of suitable antifoggants, employed preferably are compounds described in paragraph numbers [0062] and [0063] of JP-A No. 9-90550. Furthermore, other suitable antifoggants are disclosed in U.S. Pat. No. 5,028,523, and British Patent Application Nos. 92221383. No. 4, 9300147. No. 7, and 9311790. No. 1.

Into any one of a photosensitive layer, non-photosensitive layer and other layer may be incorporated various additives, such as a surfactant, antioxidant, stabilizer, plasticizer, UV absorbent, coating aid, etc. As these additives and other additives are employed compounds described In Research Disclosure Item 17029 (June, 1978, a pages 9–15). In silver halide photothermographic materials relating to the invention are used sensitizing dyes described in JP-A 63-159841, 60-140335, 63-231437, 63-259651, 63-304242, and 63-15245; U.S. Pat. Nos. 4,639,414, 4,740,455, 4,741,966, 4,751,175 and 4,835,096. Sensitizing dyes usable in the invention are described in Research Disclosure Item 17643, Sect. IV-A (December, 1978 page 23), ibid, Item 1831 Sect. X (August, 1978, page 437) and cited literatures. There can be advantageously sensitizing dyes having spectral sensitivity suited for spectral characteristics of various scanner light sources. Examples thereof include simple merocyanines for argon ion laser light source, as described in JP-A 60-162247 and 2-48635; U.S. Pat. No. 2,161,331; West German Patent 936,071 and Japanese Patent Application No. 3-189532; three-nuclei cyanine dyes described in JP-A 50-62425, 54-18726 and 59-101119 and merocyanines described in Japanese Patent Application No. 6-103272 for helium-neon laser light source; thiacarbocyanine dyes for LED light sources and infrared semiconductor laser light sources, as described in JP-B 48-42172, 51-9609 and 55-39818, and JP-A 62-284343 and 2-105135. Further, examples of infrared sensitizing dyes usable in silver halide infrared-sensitive photothermographic materials include tricarbocyanines described in JP-A 59-191032 and 60-80841 and dicarbocyanines containing 4-quinoline nucleus described in JP-A 59-192242 and JP-A 3-67242 in general formulas (IIIa) and (IIIb), for infrared semiconductor laser light source. In cases of the wavelength of an infrared laser light source being 750 to 800 nm, to meet such a wavelength region are preferably employed sensitizing dyes described in JP-A 4-182639 and 5-341432; JP-B 6-52387 3-10931, 5-72661 and 5-88292; JP-A 7-13295, 8-194282, 9-166844, 9-281631, 9-292672, 9-9-292673, and 10-73900; U.S. Pat. No. 5,441,866; and Japanese Patent Application No. 11-52559. These sensitizing dyes are used alone or in combination, specifically for the purpose of supersensitization. A dye itself exhibiting no spectral sensitization action or a substance exhibiting no absorption in the visible region, both of which exhibit supersensitization together with a sensitizing dye, may be incorporated in the emulsion. Argon ion laser (488 nm), He—Ne laser (633 nm), red semiconductor laser (670 nm) and infrared semiconductor laser (790 nm, 820 nm) are employed for exposure of photothermographic materials relating to the invention. Of these, infrared semiconductor laser is preferred in terms of its laser power being high and the use thereof making photothermographic materials transparent.

Embodiments of the present invention will be explained based on examples, but the invention is not limited to these examples.

EXAMPLES

Evaluation Method

Sharpness

Silver halide photothermographic material samples were each spectrally exposed, through an interference filter, to white light of 2856 K. Exposed samples were thermally developed at 120° C. for 5 sec. using a thermal developing machine having a heated drum. Sharpness was evaluated based on an MTF value at an optical density of 1.0 and 15 lines/mm.

Interference Fringe

Using a laser imager mounted with an 810 nm semiconductor laser, the emulsion layer side of a silver halide photothermographic material in B4 size was subjected to scanning exposure and then to thermal development by means of a heated drum at 120° C. for 5 sec. Thermally developed samples were each evaluated with respect to interference fringes, based on the following criteria:

A: no interference fringe observed,
B: interference fringes observed to some extent (based on the viewing angle),
C: slight interference fringes observed,
D: interference fringes rather clearly observed, and
E: interference fringes clearly observed.

Surface Resistivity

The surface resistivity of the back layer-side of the subbed base was measure by use of Tera-Ohmmeter Model VE-30 (available from KAWAGUCHI DENKI Co. Ltd.) in an atmosphere at 23° C. and 20% RH.

Scratch Resistance

Thermally developed photothermographic material samples were allowed to stand in an atmosphere of 23° C. and 55% RH for 24 hrs. A sapphire needle having a curvature radius of 0.15 mm on its top was placed vertically onto the emulsion side of each sample and moved at a speed of 60 cm/min, while the load on the sapphire needle was gradually varied from 0 g to 200 g. The load when it scratched the polyester support was defined as the measure of scratch resistance, in which 150 g or more is a superior level and 100 g or less is unacceptable levels for practical use.

Emulsion Coatability

Using a slide hopper, a coating solution of photothermographic emulsion layer was coated on a subbed support at a speed of 30 m/min to achieve a silver coverage of 2.1 g/m$^2$. Coatability on the subbed surface was evaluated in terms of the number of coating streaks produced in a coated area of 1 m (coated width)×1 m (coated length). No more than 1 streak is an acceptable level for practical use.

Dust Attraction

The emulsion side of a thermally developed sample was rubbed a few times with a rubber roller in an atmosphere of 23° C. and 20% RH, and cigarette ashes were placed close thereto and observed whether the ashes were attracted to the film surface. Such dust attraction was evaluated based on the following criteria:

A: no attraction occurred even when the ashes were brought to within 1 cm,
B: attraction occurred when placed within 1 to 4 cm,
C: attraction occurred when placed within 4 to 10 cm,
D: attraction occurred even when placed close to more than 10 cm.

Grades of A and B are acceptable levels for common practical use.

Adhesion of Emulsion to Support

A piece of cellophane tape was pressed onto the emulsion side of a photothermographic material sample before or after being subjected to thermal development and abruptly peeled off. In this case, the area peeled from the emulsion layer was measured. Adhesion of the emulsion to the support was evaluated based on the following criteria:

1: the adhesive strength was slight and the emulsion layer was completely peeled away,
2: the peeled area was not less than 50% but less than 100%,
3: a peeled area was not less than 20% but less than 50%,
4: the adhesive strength was high and a peeled area was not less than 5% but less than 20%, and
5: the adhesion strength was very high and a peeled area was less than 5%, Grades 4 and 5 are acceptable levels for practical use.

EXAMPLE 1

Preparation of Sublayer

Both surfaces of a polyethylene terephthalate (PET) film support was subjected to corona discharging at 8 w/m$^2$·min. Onto the surface of the emulsion side, subbing coating compositions a-1 through a-6 descried below were each applied and dried at a temperature of 140° C. to form a dried layer thickness of 0.4 μm. The resulting coating was designated Subbing Layer A-1 through A-6, respectively. Onto the opposite surface, the subbing coating composition b-1 (antistatic coating composition) described below was applied to form a dried layer thickness of 0.06 μm. The subbing coating composition b-2 was coated and dried at 140° C. The thus subbed layer was designated as sublayer B-1. The thus sub-coated supports were thermally treated at 140° C. for 2 min. to obtain subbed supports.

Subbing coating composition a-1

| | |
|---|---|
| P-1 (30 wt % solid) | 124 g |
| Surfactant A-13 (described in JP-A 9-73153) | 0.6 g |
| Infrared absorbing compound (Tables 1 to 4) | 3 g |
| (water/methanol solution of 1/1, 1 wt %) | |
| Silica fine particles (av. size of 2 μm) | 0.3 g |
| Distilled water to make | 1 lit. |

A-13

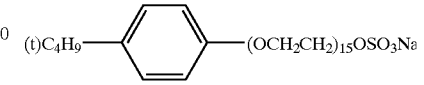

Subbing coating composition a-2

| | |
|---|---|
| P-1 (30 wt % solid) | 62 g |
| P-2 (30 wt % solid) | 62 g |
| Surfactant A-13 (described in JP-A 9-73153) | 0.6 g |
| Infrared absorbing compound (Tables 1 to 4) | 3 g |
| (water/methanol = 1/1, 1 wt %) | |
| Silica fine particles (av. size of 2 μm) | 0.3 g |
| Distilled water to make | 1 lit. |

Subbing coating composition a-3

| | |
|---|---|
| P-3 (30 wt % solid) | 124 g |
| Surfactant A-13 (described in JP-A 9-73153) | 0.6 g |
| Infrared absorbing compound (Tables 1 to 4) | 3 g |
| (water/methanol = 1/1, 1 wt %) | |
| Silica fine particles (av. size of 2 μm) | 0.3 g |
| Distilled water to make | 1 lit. |

Subbing coating composition a-4

| | |
|---|---|
| P-6 (acetone/dioxane = 3/1, 20 wt %) | 180 g |
| Surfactant A-13 (described in JP-A 9-73153) | 0.6 g |
| Infrared absorbing compound (Tables 1 to 4) | 3 g |
| (acetone solution, 1 wt %) | |
| Silica fine particles (av. size of 2 μm) | 0.3 g |
| Acetone/dioxane (=3/1) to make | 1 lit. |

Subbing coating composition a-5

| | |
|---|---|
| P-7 (acetone/dioxane = 3/1, 20 wt %) | 180 g |
| Surfactant A-13 (described in JP-A 9-73153) | 0.6 g |
| Infrared absorbing compound (Tables 1 to 4) | 3 g |
| (acetone solution, 1 wt %) | |
| Silica fine particles (av. size of 2 μm) | 0.3 g |
| Acetone/dioxane (=3/1) to make | 1 lit. |

Subbing coating composition a-6

| | |
|---|---|
| Modified hydrophilic polyester copolymer (B) (15 wt %) | 250 g |
| Surfactant A-13 (described in JP-A 9-73153) | 0.6 g |
| Infrared absorbing compound (Tables 1 to 4) | 3 g |
| (water/methanol solution of 1/1, 1 wt %) | |
| Silica fine particles (av. size of 2 μm) | 0.3 g |
| Distilled water to make | 1 lit. |

-continued

| Subbing coating composition b-1 (for Samples 17 to 21) | |
|---|---|
| P-1 (30 wt % solid) | 13 g |
| P-3 (30 wt % solid) | 3 g |
| Surfactant A-13 (described in JP-A 9-73153) | 0.4 g |
| Silica fine particles (av. size of 2 μm) | 0.3 g |
| SN-1 (8 wt % solid) | 110 g |
| Distilled water to make | 1 lit. |
| Subbing coating composition b-2 | |
| P-1 (30 wt % solid) | 26 g |
| P-3 (30 wt % solid) | 98 g |
| Surfactant A-13 (described in JP-A 9-73153) | 0.6 g |
| Silica fine particles (av. size of 2 μm) | 0.3 g |
| Distilled water to make | 1 lit. |

On the sublayer (B-1), a backing layer coating composition, c-1 described below was coated and dried at 140° C. to form a 0.3 μm thick back protective layer.

| Back layer coating composition c-1 | |
|---|---|
| Cellulose diacetate (10 wt % methyl ethyl ketone solution) | 150 ml |
| Surfactant A-13 (described in JP-A 9-73153) | 0.6 g |
| Infrared absorbing compound (Tables 1 to 4) (dissolved or dispersed in water, dimethylformamide, acetone or methylene chloride) | 70 ml |
| Silica fine particles (av. size of 2 μm) | 3 g |

Coating of Silver Halide Photothermographic Emulsion

Preparation of Silver Halide Emulsion A

In 900 ml of deionized water were dissolved 7.5 g of gelatin and 10 mg of potassium bromide. After adjusting the temperature and the pH to 35 ° C. and 3.0, respectively, 370 ml of an aqueous solution containing 74 g silver nitrate and an equimolar aqueous solution containing potassium bromide, potassium iodide (in a molar ratio of 98 to 2) $1 \times 10^{-6}$ mol/mol Ag of Ir(NO)Cl$_5$ and $10^{-4}$ mol/mol Ag of rhodium chloride were added by the controlled double-jet method, while the pAg was maintained at 7.7. Thereafter, 4-hydroxy-6-methyl-1,3,3a,7-tetraazaindene was added and the pH was adjusted to 5 using NaOH. There was obtained cubic silver iodobromide grains having an average grain size of 0.06 μm, a variation coefficient of the projection area equivalent diameter of 8 percent, and the proportion of the {100} face of 87 percent. The resulting emulsion was flocculated to remove soluble salts, employing a flocculating agent and after desalting, 0.1 g of phenoxyethanol was added and the pH and pAg were adjusted to 5.9 and 7.5, respectively, to obtain silver halide emulsion A.

Preparation of Sodium Behenate Solution A

In 945 ml water were dissolved 32.4 g of behenic acid, 9.9 g of arachidic acid and 5.6 g of stearic acid at 90° C. Then, after adding 98 ml of 1.5M aqueous sodium hydroxide solution with stirring and further adding 0.93 ml of concentrated nitric acid, the solution was cooled to a temperature of 55° C. to obtain an aqueous behenic acid sodium salt solution.

Preparation of Pre-formed Emulsion

To the obtained sodium behenate solution were added 15.1 g of silver halide emulsion A obtained above and the pH was adjusted to 8.1 with sodium hydroxide. Subsequently, 147 ml of 1M aqueous silver nitrate solution was added in 7 min. and stirring continued further for 20 min., then, the reaction mixture was subjected to ultrafiltration to remove aqueous soluble salts. The resulting silver behenate was comprised of particles exhibiting an average size of 0.8 μm and a degree of monodipersity of 8%. After forming flock of dispersion, water was removed, then, washing and removal of water were repeated six times and dried to a pre-formed emulsion.

Preparation of Silver Halide Photothermographic Emulsion

The pre-formed emulsion was divided to two halves and to one of them, 544 g of methyl ethyl ketone solution of polyvinyl butyral (av. molecular weight of 3,000, 17 wt %) and 107 g of toluene were gradually added and dispersed under 280 kgf/cm$^2$.

On each of sublayers (A-1 through A-6), the following layers were respectively coated to prepare photothermographic material samples. Drying was conducted at 60° C. for 15 min.

Coating of Silver Halide Photothermographic Emulsion Layer

The following coating composition was coated so as to have a silver coverage of 2.1 g/m$^2$.

| | |
|---|---|
| Silver halide photothermographic emulsion | 240 g |
| Sensitizing dye-1 (0.1 wt % methanol solution) | 1.7 ml |
| Pyridinium bromide perbromide (6 wt % Methanol solution) | 3 ml |
| Calcium bromide (0.1 wt % methanol solution) | 1.7 ml |
| Antifoggant-2 (10 wt % methanol solution) | 1.2 ml |
| 2-(4-Chlorobenzoyl)benzoic acid (12 wt % methanol solution) | 9.2 ml |
| 2-Mercaptobenzimidazole (12 wt % methanol solution) | 11 ml |
| Tribromomethylsulfoquinoline (5 wt % methanol solution) | 17 ml |
| Developer-1 (20 wt % methanol solution) | 29.5 ml |

Sensitizing Dye-1

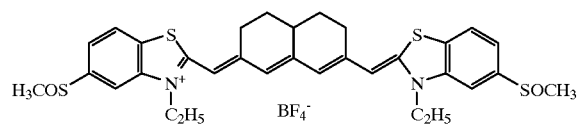

Antifoggant-2

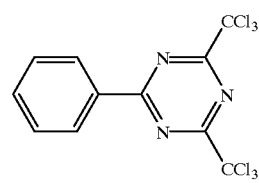

Developer-1

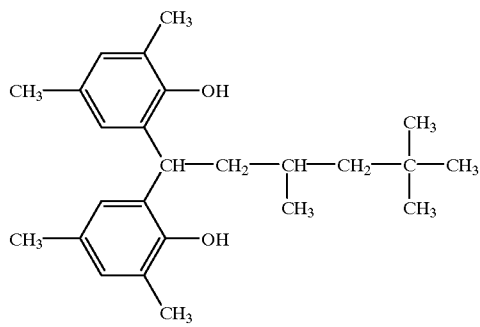

Coating of Emulsion Protective Layer

The following coating composition was coated on the silver halide photothermographic emulsion layer.

| | |
|---|---|
| Acetone | 35 ml/m² |
| Methyl ethyl ketone | 17 ml/m² |
| Cellulose acetate | 2.3 g/m² |

| -continued | |
|---|---|
| Methanol | 7 ml/m² |
| Phthalazine | 250 mg/m² |
| 4-Methylphthalic acid | 180 mg/m² |
| Tetrachlorophthalic acid | 150 mg/m² |
| Tetrachlorophthalic acid anhydride | 170 mg/m² |
| Matting agent, monodisperse silica Having av. size of 4 μm and a degree of monodispersity of 10% | 70 mg/m² |
| $C_9H_{17}$—$C_6H_4SO_3Na$ | 10 mg/m² |

Exposure and Thermal Development

Photothermographic material samples were each cut to a size of 430 mm (longitudinal)×345 mm (lateral) and exposed using an imager having 810 nm semiconductor laser, and then thermally developed at 110° C. for 15 sec using an automatic processor installed with a heated drum (except for testing of sharpness). In this case, exposure and development were conducted in an atmosphere at 23° C. and 50% RH.

Samples were tested according to the methods described above and evaluation results are shown in Tables 1 to 4.

TABLE 1

| | Infrared Absorbing Compd. | | | | | Surface | | | |
|---|---|---|---|---|---|---|---|---|---|
| Sample | Sublayer | Sublayer | Back-layer | Antistatic Layer | Sharpness | Interference Fringe | Resistivity (Ω) | Scratch Resistance | Remark |
| 1 | A-1 | PM-6 | — | — | 0.96 | A | $3.2 \times 10^{12}$ | 175 g | Inv. |
| 2 | A-1 | PM-4 | — | — | 0.97 | B | $4.5 \times 10^{12}$ | 200 g | Inv. |
| 3 | A-1 | PM-8 | — | — | 0.96 | A | $6.0 \times 10^{12}$ | 180 g | Inv. |
| 4 | A-2 | PM-1 | — | — | 0.96 | B | $3.3 \times 10^{12}$ | 160 g | Inv. |
| 5 | A-1 | — | PM-6 | — | 0.79 | D | $3.4 \times 10^{12}$ | 80 g | Comp. |
| 6 | A-2 | PM-8 | — | B-1 | 0.98 | A | $4.2 \times 10^{10}$ | 180 g | Inv. |

TABLE 2

| | Infrared Absorbing Compd. | | | | | Surface | | | |
|---|---|---|---|---|---|---|---|---|---|
| Sample | Sublayer | Sublayer | Back-layer | Antistatic Layer | Sharpness | Interference Fringe | Resistivity (Ω) | Coatability | Remark |
| 7 | A-4 | SS-1 | — | — | 0.98 | A | $4.0 \times 10^{12}$ | 0 | Inv. |
| 8 | A-4 | SS-2 | — | — | 0.97 | A | $3.2 \times 10^{12}$ | 1 | Inv. |
| 9 | A-5 | SS-3 | — | — | 0.98 | A | $4.5 \times 10^{12}$ | 1 | Inv. |
| 10 | A-5 | SS-4 | — | — | 0.97 | A | $6.0 \times 10^{12}$ | 0 | Inv. |
| 11 | A-5 | — | SS-1 | — | 0.78 | D | $3.2 \times 10^{12}$ | 4 | Comp. |
| 12 | A-5 | SS-3 | — | B-1 | 0.99 | A | $4.0 \times 10^{10}$ | 1 | Inv. |

TABLE 3

| | Infrared Absorbing Compd. | | | | | Surface | | | |
|---|---|---|---|---|---|---|---|---|---|
| Sample | Sublayer | Sublayer | Back-layer | Antistatic Layer | Sharpness | Interference Fringe | Resistivity (Ω) | Dust Attraction | Remark |
| 13 | A-3 | SN-1 | — | — | 0.94 | A | $3.2 \times 10^{12}$ | AB | Inv. |
| 14 | A-6 | SN-1 | — | — | 0.94 | A | $5.0 \times 10^{12}$ | AB | Inv. |

TABLE 3-continued

| | Infrared Absorbing Compd. | | | | | Surface | | |
|---|---|---|---|---|---|---|---|---|
| Sample | Sublayer | Sublayer | Back-layer | Antistatic Layer | Sharpness | Interference Fringe | Resistivity (Ω) | Dust Attraction | Remark |
| 15 | A-6 | SN-1 | — | B-1 | 0.97 | A | $5.0 \times 10^{10}$ | A | Inv. |
| 16 | A-6 | — | SN-1 | — | 0.68 | C | $4.2 \times 10^{12}$ | C | Comp. |

TABLE 4

| | Infrared Absorbing Compd. | | | | | Surface | | Layer Adhesion | |
|---|---|---|---|---|---|---|---|---|---|
| Sample | Sublayer | Sublayer | Back-layer | Antistatic Layer | Sharpness | Interference Fringe | Resistivity (Ω) | Before | After | Remark |
| 17 | A-3 | CP-1 | — | — | 0.95 | A | $4.5 \times 10^{12}$ | 5 | 4 | Inv. |
| 18 | A-6 | CP-1 | — | — | 0.95 | A | $3.2 \times 10^{12}$ | 4 | 4 | Inv. |
| 19 | A-3 | CP-1 | — | B-1 | 0.98 | A | $5.0 \times 10^{10}$ | 5 | 4 | Inv. |
| 20 | A-3 | — | CP-1 | — | 0.77 | C | $3.3 \times 10^{12}$ | 3 | 3 | Comp. |

As can be seen from Tables 1 to 4, inventive samples, in which infrared absorbing compounds were contained in the sublayer exhibiting superior sharpness and no interference fringe was observed and thereby, superior silver halide photothermographic materials were obtained. On the contrary, comparative samples, in which infrared absorbing compounds were contained in the back layer, were inferior in sharpness and desirable photothermographic materials were not obtained. Conductive fine metal oxide particles contained in the back layer exhibited enhanced conductivity and also played a role as an infrared absorbing compound, synergistically resulting in enhanced sharpness.

What is claimed is:

1. A silver halide photothermographic material comprising on a support an emulsion layer containing an organic silver salt and a silver halide and a sublayer interposed between the support and the emulsion layer, wherein the sublayer comprises an infrared absorbing compound exhibiting an absorption maximum at a wavelength of 700 to 900 nm, and the infrared absorbing compound is a compound represented by formula (I-2)

formula (I-2)

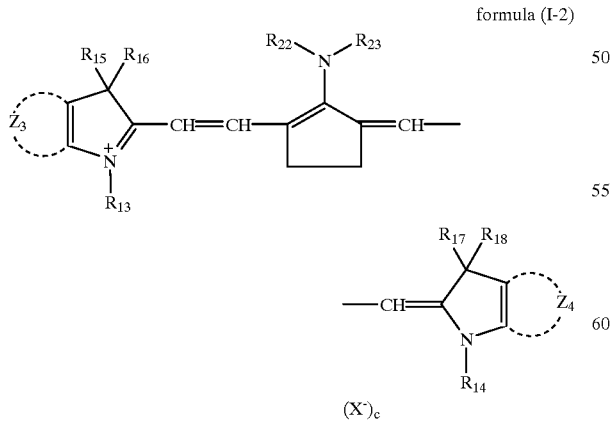

wherein $Z_3$ and $Z_4$ are each the group of atoms necessary to form a benzene or naphthalene ring; $R_{13}$ and $R_{14}$ are each an alkyl group, an aralkyl group or alkenyl group; $R_{22}$ and $R_{23}$ are each an alkyl group or an aryl group; $R_{15}$, $R_{16}$, $R_{17}$ and $R_{18}$ are each an alkyl group, provided that $R_{15}$ and $R_{16}$, or $R_{17}$ and $R_{18}$ may combine with each other to form a 5- or 6-membered ring; X is an anion and c is 0 or 1;

wherein said sublayer contains a binder, the binder including at least two copolymers and the difference in glass transition between said two copolymers is 10 to 80° C.

2. The photothermographic material of claim 1, wherein said infrared absorbing compound is contained in an amount of 0.1 to 1000 mg/m².

3. A silver halide photothermographic material comprising on a support an emulsion layer containing an organic silver salt and a silver halide and a sublayer interposed between the support and the emulsion layer, wherein the sublayer comprises an infrared absorbing compound exhibiting an absorption maximum at a wavelength of 700 to 900 nm, and the infrared absorbing compound is a compound represented by formula (II):

formula (II)

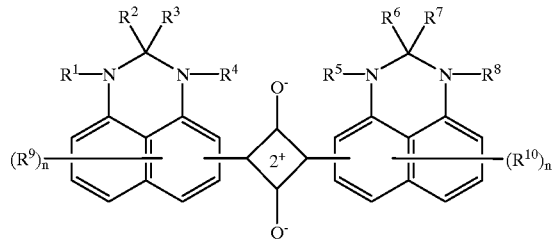

wherein $R^1$, $R^4$, $R^5$ and $R^8$ are each a hydrogen atom, an alkyl group, a cycloalkyl group, or an aryl or aralkyl group; $R^2$, $R^3$, $R^6$ and $R^7$ are each a hydrogen atom, an alkyl group, a cycloalkyl group, an aryl group, a heterocyclic group or an aralkyl group, —$CH_2OR$, in which R is an alkylacyl group, —$C(=O)R'$, —$SiR''R'''R''''$ or —$SO_2R''''$, in which R', R'', R''', R'''' and R'''' are each an alkyl group, provided that $R^1$ and $R^2$, $R^3$ and $R^4$, $R^5$ and $R^6$, $R^7$ and $R^8$, or $R^2$ and $R^3$, or $R^6$ and $R^7$ may combine together with each other to form a 5-, 6- or 7-membered ring; $R^9$ and $R^{10}$ are each a univalent group; and n is an integer of 1, 2 or 3;

wherein said sublayer contains a binder, the binder including at least two copolymers and the difference in glass transition between said two copolymers is 10 to 80° C.

4. The photothermographic material of claim 3, wherein in the formula, $R^1$, $R^4$, $R^5$ and $R^8$ are each a hydrogen atom, an alkyl group having 1 to 20 carbon atoms, a cycloalkyl group having 3 to 20 carbon atoms, or an aryl having not more than 14 carbon atoms or aralkyl group; $R^2$, $R^3$, $R^6$ and $R^7$ are each a hydrogen atom, an alkyl group having 1 to 20 carbon atoms, a cycloalkyl group having 3 to 20 carbon atoms, an aryl having not more than 14 carbon atoms, a heterocyclic group or an aralkyl group, —CH$_2$OR, in which R is an alkylacyl group, —C(=O)R', —SiR"R'"R"" or —SO$_2$R"", in which R', R", R"', R"" and R""' are each an alkyl group having 1 to 20 carbon atoms, or $R^1$ and $R^2$, $R^3$ and $R^4$, $R^5$ and $R^6$, $R^7$ and $R^8$, or $R^2$ and $R^3$, or $R^6$ and $R^7$ combine together with each other to form a 5-, 6- or 7-membered ring; $R^9$ and $R^{10}$ are each a univalent group; and n is an integer of 1 to 3, with proviso that when $R^2$, $R^3$, $R^6$ and $R^7$ are each a heterocyclic group, $R^9$ and $R^{10}$ may be a hydrogen atom.

5. The photothermographic material of claim 3, wherein said infrared absorbing compound is a compound represented by formula (III), (IV) or (V):

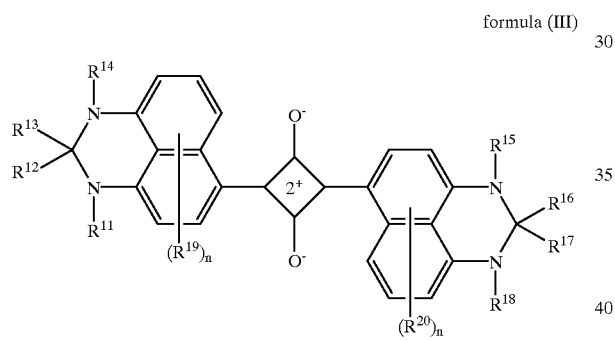

formula (III)

wherein $R^{11}$, $R^{14}$, $R^{15}$ and $R^{18}$ are each a hydrogen atom, an alkyl group, a cycloalkyl group, or an aryl or aralkyl group; $R^{12}$, $R^{13}$, $R^{16}$ and $R^{17}$ are each a hydrogen atom, an alkyl group, a cycloalkyl group, an aryl group, a heterocyclic group, an aralkyl group, —CH$_2$OR, in which R is an alkylacyl group, —C(=O)R', —SiR"R'"R"", or —SO$_2$R"" in which R', R", R"', R"" and R""' are each an alkyl group, provided that $R^{11}$ and $R^{12}$, $R^{13}$ and $R^{14}$, $R^{15}$ and $R^{16}$, $R^{17}$ and $R^{18}$, $R^{12}$ and $R^{13}$, or $R^{16}$ and $R^{17}$ may combine with each other to form a 5-, 6- or 7-membered ring; $R^{19}$ and $R^{20}$ are each a univalent group; and n is an integer of 1, 2 or 3;

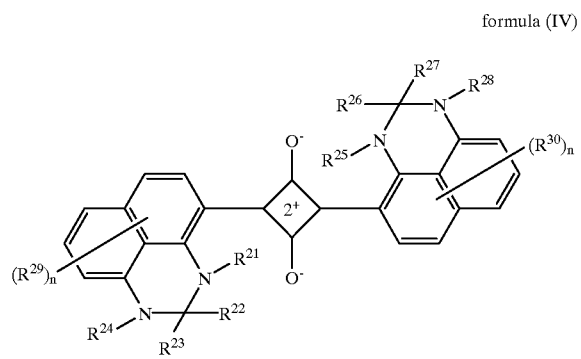

formula (IV)

wherein $R^{21}$, $R^{24}$, $R^{25}$ and $R^{28}$ are each a hydrogen atom, an alkyl group, a cycloalkyl group, an aryl group or an aralkyl group, $R^{22}$, $R^{23}$, $R^{26}$ and $R^{27}$ are each a hydrogen atom, an alkyl group, a cycloalkyl group, an aryl group, a heterocyclic group or an aralkyl group, provided that $R^{21}$ and $R^{22}$, $R^{23}$ and $R^{24}$, $R^{25}$ and $R^{26}$, $R^{27}$ and $R^{28}$, $R^{22}$ and $R^{23}$, or $R^{26}$ and $R^{27}$ may combine with each other to form a 5- or 6-membered ring; $R_{29}$ and $R_{30}$ are each a hydrogen atom or a univalent group; n is an integer of 1, 2 or 3; and

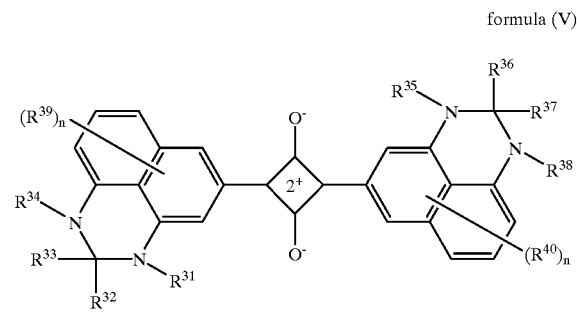

formula (V)

wherein $R^{31}$, $R^{34}$, $R^{35}$ and $R^{38}$ are each a hydrogen atom, an alkyl group, a cycloalkyl group, an aryl group or an aralkyl group, $R^{32}$, $R^{33}$, $R^{36}$ and $R^{37}$ are each a hydrogen atom, an alkyl group, a cycloalkyl group, an aryl group, a heterocyclic group or an aralkyl group, provided that $R^{31}$ and $R^{32}$, $R^{33}$ and $R^{34}$, $R^{35}$ and $R^{36}$, $R^{37}$ and $R^{38}$, $R^{32}$ and $R^{33}$, or $R^{36}$ and $R^{37}$ may combine with each other to form a 5- or 6-membered ring; $R^{39}$ and $R^{40}$ are each a hydrogen atom or a univalent group; and n is an integer of 1, 2 or 3.

6. The photothermographic material of claim 3, infrared absorbing compound is contained in an amount of 0.1 to 1000 mg/m$^2$.

* * * * *

UNITED STATES PATENT AND TRADEMARK OFFICE
CERTIFICATE OF CORRECTION

PATENT NO. : 6,391,535 B1
DATED : May 21, 2002
INVENTOR(S) : Arimoto et al.

It is certified that error appears in the above-identified patent and that said Letters Patent is hereby corrected as shown below:

Title page, Item [54] and Column 1, line 1,
Title, after "HALIDE" delete "PHOTOTHERMOGRAHIC" and insert therefor
-- PHOTOTHERMOGRAPHIC --;
Item [56], References Cited, U.S. PATENT DOCUMENTS, delete "4,581,321" and insert therefor -- 4,581,325 --.

Column 3,
Line 18, after "aryl group" delete "." and insert therefor -- , --.

Column 5,
Line 62, after "$R^{17}$" delete "are hydrogen" and insert therefor -- are each a hydrogen --; and
Line 63, after "atom," delete "alkyl" and insert therefor -- an alkyl group, --.

Column 6,
Line 4, before "are each" delete "R" and insert therefor -- $R^{20}$ --; and
Line 53, after "$R^{32}$" delete "$R^{33}$, $R^{36}$" and insert therefor -- $R^{33}$, $R^{36}$ --.

Column 10,
Line 29, after "fluorine," delete "clorinr" and insert therefor -- chlorine --.

Column 11,
Line 49, after "quaternary" (second occurrence) delete "pgosphonium" and insert therefor
-- phosphonium --;
Line 51, after "m2" (first occurrence) insert therefor -- is --; and
Line 53, after "defined in" delete "R1" and insert therefor -- $R_1$ --.

Column 12,
Line 18, in formula I-1, delete end value "$Z_3$" and insert therefor -- $Z_4$ --.

Column 14,
Line 3, before "may" delete "R" and insert therefor -- $R_{18}$ --;
Line 3, after "with" delete "-"; and
Line 8, after "$R_{18}$" delete "$R^{22}$ and $R^{23}$" and insert therefor -- $R_{22}$ and $R_{23}$ --.

Column 15,
Line 64, after "were" delete "fitered" and insert therefor -- filtered --.

Column 17,
Line 15, after "$R_1$" delete "$R_4R$" and insert therefor -- $R_4$, $R_5$ --.

UNITED STATES PATENT AND TRADEMARK OFFICE
CERTIFICATE OF CORRECTION

PATENT NO.    : 6,391,535 B1
DATED         : May 21, 2002
INVENTOR(S)   : Arimoto et al.

It is certified that error appears in the above-identified patent and that said Letters Patent is hereby corrected as shown below:

Column 19,
Line 18, after "$R^{24}$" delete "$R^{25,\text{ and }R^{28}}$" and insert therefor -- $R^{25}$, and $R^{28}$ --; and
Line 40, after "methoxycarbonyl," delete "ethxoycarbonyl" and insert therefor
-- ethoxycarbonyl --.

Column 21,
Lines 52 and 63, after "mixture" insert therefor -- . --.

Column 22,
Line 2, after "exhibiting" delete "an" and insert therefor -- a --;
Line 36, after "near-infrared" delete "absoption" and insert therefor -- absorption --; and
Line 38, after "molar" delete "ration" and insert therefor -- ratio --.

Column 23,
Line 9, after "mixture was" delete "hermally" and insert therefor -- thermally --; and
Line 25, after "sublayer and" delete "are" and insert therefor -- is --.

Column 24,
Line 61, after "for example," delete "for example,"; and
Line 67, after "ammonia" delete "oder" and insert therefor -- odor --.

Column 25,
Line 36, before "a pH" delete "reached" and insert therefor -- reaching --;
Line 50, after "mixture" delete "were" and insert therefor -- was --; and
Line 58, after "emulsion" delete "-".

Column 26,
Line 53, after "as a" delete "dicaboxylic" and insert therefor -- dicarboxylic --; and
Line 63, after "when" delete "a" and insert therefor -- an --.

Column 27,
Line 22, after "may" delete "contains" and insert therefor -- contain --.

Column 28,
Line 21, after "within the" delete "rang" and insert therefor -- range --;
Line 34, after "through" insert therefor -- a --; and
Line 62, after "monomers" delete "socalled" and insert therefor -- so called --.

UNITED STATES PATENT AND TRADEMARK OFFICE
CERTIFICATE OF CORRECTION

PATENT NO.  : 6,391,535 B1
DATED       : May 21, 2002
INVENTOR(S) : Arimoto et al.

It is certified that error appears in the above-identified patent and that said Letters Patent is hereby corrected as shown below:

Column 29,
Line 22, after "dimethylolacrylamide" delete "N-methoxtmethylacrylamide" and insert therefor -- N-methoxymethylacrylamide --.

Column 31,
Line 18, after "such" insert therefor -- as --.

Column 32,
Line 26, after "polyester." delete "Specifically, as the hydrophilic group containing component is preferably used a dicarboxylic acid containing a sulfonate salt." and insert therefor -- Specifically, the hyrophilic group containing component is preferably a dicarboxylic acid containing a sulfonate salt. --; and
Line 51, after "aromatic" delete "icarboxylic" and insert therefor -- dicarboxylic --.

Column 33,
Line 14, after "example," insert therefor -- a --; and
Line 52, after "or a" delete "surfactanst" and insert therefor -- surfactant --.

Column 34,
Line 27, before "described" delete "skelton" and insert therefor -- skeleton --; and
Line 45, after "(CATHEC)," delete "povinyl" and insert therefor -- polyvinyl --.

Column 37,
Line 4, before "for 12 hours" delete "700c" and insert therefor -- 70° C. --; and
Line 19, after "gone at" delete "700°C." and insert therefor -- 70° C. --.

Column 38,
Line 34, before "acid ester", delete "plyacrylic" and insert therefor -- polyacrylic --;
Line 35, before "acetate," delete "derivativespolyvinyl" and insert therefor -- derivatives polyvinyl --; and
Line 40, after "These are" delete "use" and insert therefor -- used --.

Column 39,
Line 65, after "applicable" delete "bur" and insert therefor -- but --.

Column 40,
Line 59, before "mole" delete "$lx11^{-4}$" and insert therefor -- $1x10^{-4}$ --.

UNITED STATES PATENT AND TRADEMARK OFFICE
CERTIFICATE OF CORRECTION

PATENT NO. : 6,391,535 B1
DATED : May 21, 2002
INVENTOR(S) : Arimoto et al.

It is certified that error appears in the above-identified patent and that said Letters Patent is hereby corrected as shown below:

Column 41,
Line 41, after "preferably" delete "be"; and
Line 53, before "bis(carbamoyl)ditellurides," delete "(oxycarbonylditellurides," and insert therefor -- (oxycarbonyl)ditellurides, --.

Column 42,
Line 10, after "25 carbon" delete "-".

Column 47,
Line 18, after "4H-2,3a,5,6a-" delete "tatraazapentalene" and insert therefor -- tetraazapentalene --; and
Line 24, after "Specifically," delete "meracapto" and insert therefor -- mercapto --.

Column 49,
Line 13, after "base was" delete "measure" and insert therefor -- measured --.

Column 51,
Line 42, after "Ir(No)Cl$_5$ and" delete "$10^{-4}$" and insert therefor -- $1 \times 10^{-4}$ --.

Column 56,
Line 30, after "ring" delete "X" and insert therefor -- X$^-$ --.

Signed and Sealed this

Twenty-second Day of November, 2005

JON W. DUDAS
*Director of the United States Patent and Trademark Office*